(12) United States Patent
Hwang

(10) Patent No.: US 9,929,639 B2
(45) Date of Patent: Mar. 27, 2018

(54) SWITCHING POWER CONVERTER AND LIGHT LOAD CONDITION IMPROVEMENTS THEREOF

(71) Applicant: Champion Microelectronic Corporation, Hsinchu (TW)

(72) Inventor: Jeffrey Hwang, Saratoga, CA (US)

(73) Assignee: Champion Microelectronic Corporation (TW)

( * ) Notice: Subject to any disclaimer, the term of this patent is extended or adjusted under 35 U.S.C. 154(b) by 0 days.

(21) Appl. No.: 15/143,243

(22) Filed: Apr. 29, 2016

(65) Prior Publication Data

US 2016/0322907 A1    Nov. 3, 2016

Related U.S. Application Data

(60) Provisional application No. 62/156,157, filed on May 1, 2015, provisional application No. 62/273,203, filed on Dec. 30, 2015.

(51) Int. Cl.
*H02M 1/42* (2007.01)
*H02M 1/36* (2007.01)
(Continued)

(52) U.S. Cl.
CPC ........... *H02M 1/4208* (2013.01); *H02M 1/36* (2013.01); *H02M 1/4266* (2013.01); *H02M 1/4225* (2013.01); *H02M 3/33576* (2013.01); *H02M 2001/0006* (2013.01); *H02M 2001/007* (2013.01); *H02M 2001/0025* (2013.01); *H02M 2001/0032* (2013.01);
(Continued)

(58) Field of Classification Search
CPC .................................................. H02M 1/4208
See application file for complete search history.

(56) References Cited

U.S. PATENT DOCUMENTS

| | | | |
|---|---|---|---|
| 7,495,419 B1 * | 2/2009 | Ju | G05F 1/62 323/225 |
| 2008/0136342 A1 * | 6/2008 | Tamegai | H02M 3/33507 315/209 R |

(Continued)

*Primary Examiner* — Jue Zhang
*Assistant Examiner* — Trinh Q Dang
(74) *Attorney, Agent, or Firm* — Westberg Law Offices

(57) ABSTRACT

The present invention is directed toward a switching power supply and improvements thereof. In accordance with an embodiment, a switching power supply is provided. The switching power supply comprises: a first power supply stage that forms an intermediate regulated voltage; and a second power supply stage configured to accept the intermediate regulated voltage and configured to form a regulated output voltage, wherein the first power supply stage monitors an error signal that is representative of a difference between the intermediate regulated voltage and a desired level for the intermediate regulated voltage to detect a light load condition and wherein the first power supply stage enters a first power-saving mode when the error signal falls below a first threshold, a switching frequency in the first power supply stage being reduced in the first power-saving mode, and wherein the first power supply stage enters a second power-saving mode when the error signal falls below a second threshold, switching in the first power supply stage being performed in bursts in the second power-saving mode.

14 Claims, 17 Drawing Sheets

(51) Int. Cl.
*H02M 3/335* (2006.01)
*H02M 1/00* (2006.01)

(52) U.S. Cl.
CPC .... *H02M 2001/0064* (2013.01); *Y02B 70/126* (2013.01); *Y02B 70/1433* (2013.01); *Y02B 70/16* (2013.01); *Y02P 80/112* (2015.11)

(56) References Cited

U.S. PATENT DOCUMENTS

| | | | | |
|---|---|---|---|---|
| 2010/0026263 | A1* | 2/2010 | Moussaoui | H02M 3/1582 323/283 |
| 2010/0315034 | A1* | 12/2010 | Lu | H02P 23/0077 318/802 |
| 2012/0161728 | A1* | 6/2012 | Chen | H02M 3/1563 323/271 |
| 2013/0162158 | A1* | 6/2013 | Pollischansky | H05B 33/0815 315/201 |
| 2014/0043866 | A1* | 2/2014 | Zhao | H02M 3/33507 363/21.12 |
| 2014/0210445 | A1* | 7/2014 | Hasegawa | H04W 48/04 323/284 |
| 2015/0229212 | A1* | 8/2015 | Shiwaya | H02M 3/158 323/282 |

\* cited by examiner

CU6502V+CU6901V True—No StandBy Circuit
PFC Stage

| FIG. 4A | FIG. 4B |
|---|---|
| FIG. 4C | FIG. 4D |

FIG. 7

| FIG. 7A | FIG. 7B |
|---------|---------|
| FIG. 7C | FIG. 7D |

FIG. 7A

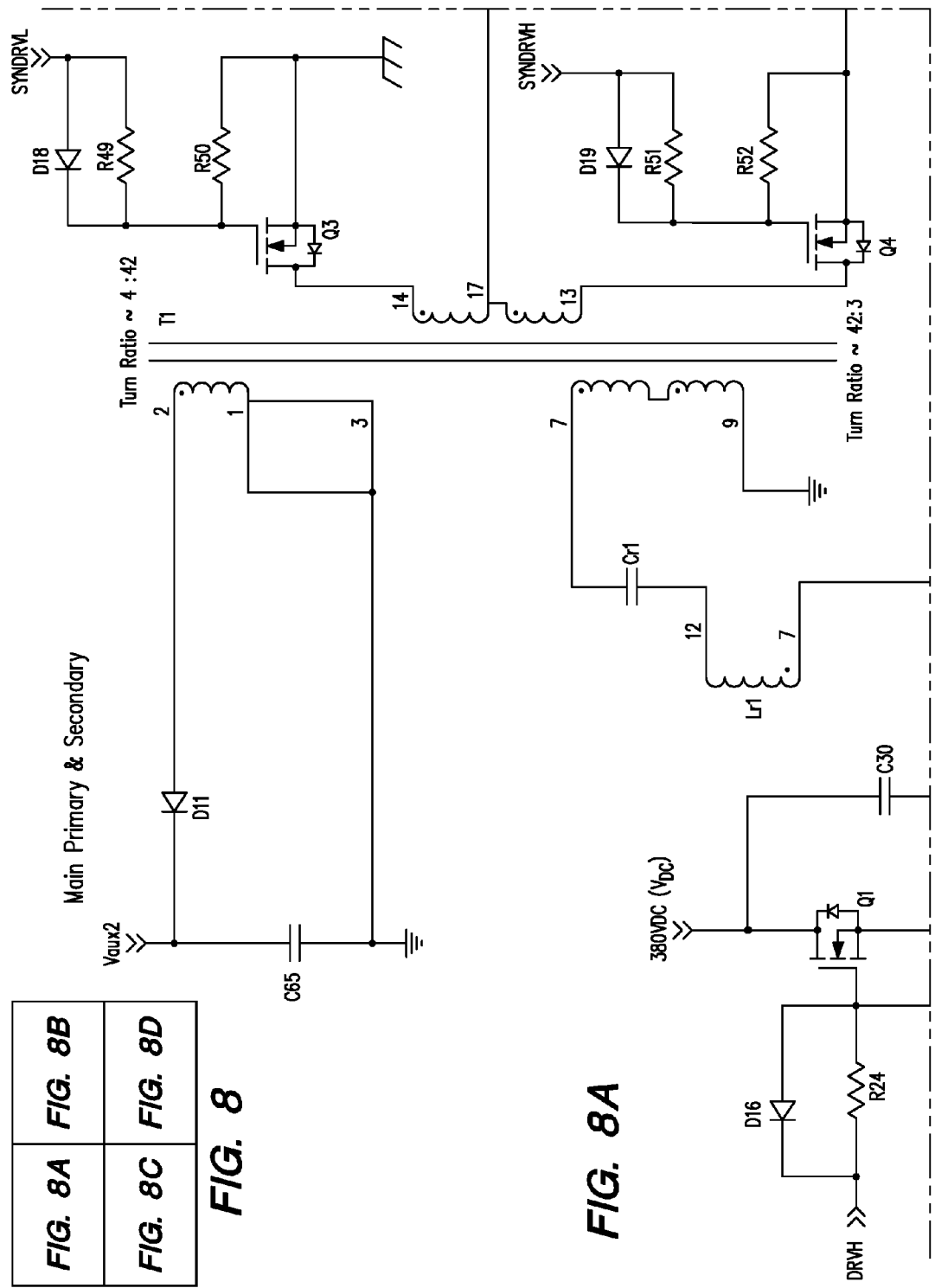

SWITCHING POWER CONVERTER AND LIGHT LOAD CONDITION IMPROVEMENTS THEREOF

This application claims priority of U.S. Provisional Application No. 62/156,157, filed May 1, 2015, and claims priority of U.S. Provisional Application No. 62/273,203, filed Dec. 30, 2015, the entire contents of each of which are hereby incorporated by reference.

BACKGROUND OF THE INVENTION

The present invention relates to the field of switching power supplies.

An off-line power supply receives power from an alternating-current (AC) source and provides a voltage-regulated, direct-current (DC) output that can be used to power a load. An exemplary off-line power supply includes a power factor correction (PFC) stage and a DC-to-DC converter stage. The PFC stage receives the AC input signal, performs rectification and maintains current drawn from the AC source substantially in phase with the AC voltage so that the power supply appears as a resistive load to the AC source. The DC-to-DC converter stage receives the rectified output of the PFC stage and generates the voltage-regulated, DC output which can be used to power the load. The rectified output of the PFC stage is typically at higher voltage and is more loosely regulated than the output of the DC-to-DC stage.

It is desired to provide an improved switching power supply.

SUMMARY OF THE INVENTION

The present invention is directed toward a switching power supply and improvements thereof. In accordance with an embodiment, a switching power supply is provided. The switching power supply comprises: a first power supply stage that forms an intermediate regulated voltage; and a second power supply stage configured to accept the intermediate regulated voltage and configured to form a regulated output voltage, wherein the intermediate voltage is set to an initial target level upon start-up of the power supply and wherein the intermediate regulated voltage is set to a second target level during steady-state operation of the power supply.

The initial target level can be higher than the second target level. The intermediate voltage can be set to a third target level under light loading conditions. The third target level can be lower than the second target level. The second target level can be approximately 380 volts DC. The first power supply stage can be a power factor correction stage and the second power supply stage can be a DC-to-DC converter stage. The initial target level can be achieved by pulling current from a feedback voltage node. A switched current source can be coupled to the feedback voltage node. The switched current source can be controlled by comparing a soft start voltage ramp to a reference voltage and when the soft start voltage ramp reaches the reference level the switched current source can be disabled.

In accordance with a further embodiment, a switching power supply is provided. The switching power supply comprises a power supply stage having controller circuitry, the controller circuitry comprising a voltage regulator, wherein during a start-up phase of the switching power supply, the voltage regulator forms a first regulated output for powering the controller circuitry and wherein after the start-up phase, the first regulated output is coupled to a second voltage source, the second voltage source being regulated at a higher level than the first regulated output, thereby disabling the voltage regulator.

The first regulated output can be coupled to the second voltage source via a diode. The controller circuitry can control switching in the power supply for generating the second voltage source. The second voltage source can provide power for the controller circuitry after the start-up phase. The switching power supply can further comprise a power factor correction (PFC) stage that forms an intermediate regulated voltage. The power supply stage can comprise a DC-to-DC converter. The DC-to-DC converter can be configured to accept the intermediate regulated voltage. An output of the DC-to-DC converter can comprise the second voltage source. The voltage regulator can receive power from the PFC stage. The PFC stage can comprise a main inductor. Power can be provided to the voltage regulator by a current induced in a second inductor that is inductively coupled to the main inductor.

In accordance with a further embodiment, a switching power supply is provided. The switching power supply comprises a power supply stage having controller circuitry, the controller circuitry receiving power from a capacitor during a start-up phase, wherein the capacitor is charged by a rectified alternating-current (AC) signal via a transistor switch and the controller circuitry comprising a voltage regulator, wherein the controller circuitry receives power from the voltage regulator after the start-up phase.

The transistor switch can be initially closed. The capacitor can be charged to an initial voltage level and, when the initial voltage level is reached, the transistor switch can be opened. During the start-up phase, controller circuitry can control switching in the power supply stage to form a regulated voltage. If the voltage level on the capacitor falls below a threshold, the switching can be halted. When the voltage approaches the threshold, the transistor switch can be closed so as to charge the capacitor and to inhibit the voltage on the capacitor from reaching the threshold, thereby preventing the switching from being halted.

The power supply stage can comprise a power factor correction (PFC) stage that forms an intermediate regulated voltage. The switching power supply can further comprise a DC-to-DC converter. The DC-to-DC converter can be configured to accept the intermediate regulated voltage. An output of the DC-to-DC converter can provide power to the voltage regulator. The initial voltage level can be approximately 15.3 to 15.5 volts and the threshold can be approximately 10.0 volts. The transistor switch can be closed when the voltage on the capacitor reaches 11.0 volts. The transistor switch can be a depletion-mode MOSFET.

In accordance with an embodiment, a switching power supply is provided. The switching power supply comprises: a first power supply stage that forms an intermediate regulated voltage, the first power supply stage comprising first controller circuitry for controlling switching in the first power supply stage for forming the intermediate regulated voltage, wherein the intermediate voltage is set to an initial target level upon start-up of the power supply and wherein the intermediate regulated voltage is set to a second target level during steady-state operation of the power supply, and wherein the controller circuitry receives power from a capacitor during a start-up phase, wherein the capacitor is initially charged by a rectified alternating-current (AC) signal via a transistor switch and wherein the transistor switch is closed unless a voltage on the capacitor approaches a threshold; and a second power supply stage configured to accept the intermediate regulated voltage and configured to form a power supply output voltage, the second power supply stage comprising a controller circuitry for controlling switching in the second power supply stage and the controller circuitry of the second power supply stage comprising a voltage regulator, wherein during a start-up phase of the switching power supply, the voltage regulator forms a first regulated output for powering the controller circuitry of the second power supply stage and wherein after the start-up phase, the first regulated output is coupled to the power supply output voltage, the power supply output voltage being regulated at a higher level than the first regulated output, thereby disabling the voltage regulator.

In accordance with a further embodiment, a switching power supply is provided. The switching power supply comprises: a first power supply stage that forms an intermediate regulated voltage; and a second power supply stage configured to accept the intermediate regulated voltage and configured to form a regulated output voltage. The first power supply stage monitors an error signal that is representative of a difference between the intermediate regulated voltage and a desired level for the intermediate regulated voltage to detect a light load condition. The first power supply stage enters a first power-saving mode when the error signal falls below a first threshold, a switching frequency in the first power supply stage being reduced in the first power-saving mode. The first power supply stage enters a second power-saving mode when the error signal falls below a second threshold, switching in the first power supply stage being performed in bursts in the second power-saving mode.

A bias circuit that provides operational power to the first power supply stage can provide a reduced current between switching bursts in the second power-saving mode. The error signal can represent input power provided to the first power supply stage. The switching frequency can be reduced from 67.5 kHz to 50 kHz in the first power-saving mode. The first power supply stage can remain in the first power-saving mode until the error signal rises above the first threshold by a hysteresis margin. The second threshold can be lower than the first threshold. Switching in the first power supply stage is halted while the error signal remains below the second threshold. The switching power supply can include a photo-couple that provides a control signal from the first power supply stage to the second power supply stage, the control signal for enabling and disabling switching in the second power supply stage. A current in the photo-couple can disable switching in the second power supply and a lack of current in the photo-couple can enable switching in the second power supply stage.

In accordance with a further embodiment, a switching power supply is provided. The switching power supply comprises: a first power supply stage that forms an intermediate regulated voltage; and a second power supply stage configured to accept the intermediate regulated voltage and configured to form a regulated output voltage. A signal that is representative of an output current of the second power supply stage is monitored to detect a light load condition. The signal that is representative of the output current of the second power supply stage is also monitored to detect an overcurrent condition.

Upon detection of the light load condition, the second power supply stage can enter a power-saving mode in which switching is performed in bursts. A feedback signal representative of an output voltage of the second power supply stage can be monitored in the power-saving mode of operation and, when the feedback signal falls below a threshold, switching can be enabled until the feedback signal rises above the threshold by a hysteresis margin. Switching in the second power supply stage can be performed at a constant switching frequency in the power-saving mode. Switching in the second power supply stage can be performed in accordance with frequency modulation when not in the power-saving mode. In the power-saving mode, the output voltage can be regulated by varying duration of switching bursts in comparison to periods between bursts. The constant switching frequency can be user-selectable. The constant switching frequency can be user-selectable by a reference voltage. The signal that is representative of an output current of the second power supply stage can pass through a first path is that averages the output current and that detects the light load condition. The signal that is representative of an output current of the second power supply stage can pass through a second path for over-current protection. The paths for the signal representative of an output current of the second power supply stage can have a user-selectable first pole and a user-selectable second pole for frequency compensation. A level of output current desired for entry into the power-saving mode can user-selectable.

These and other embodiments are described herein.

BRIEF DESCRIPTION OF THE DRAWINGS

The present invention is described with respect to particular exemplary embodiments thereof and reference is accordingly made to the drawings in which:

FIG. 7A-D illustrates a detailed schematic diagram of a DC-to-DC converter and DC-to-DC converter controller in accordance with an embodiment of the present invention;

FIG. 8A-D illustrates DC-to-DC converter transformer circuitry in accordance with an embodiment of the present invention.

DETAILED DESCRIPTION OF A PREFERRED EMBODIMENT OF THE INVENTION

Figure 1:
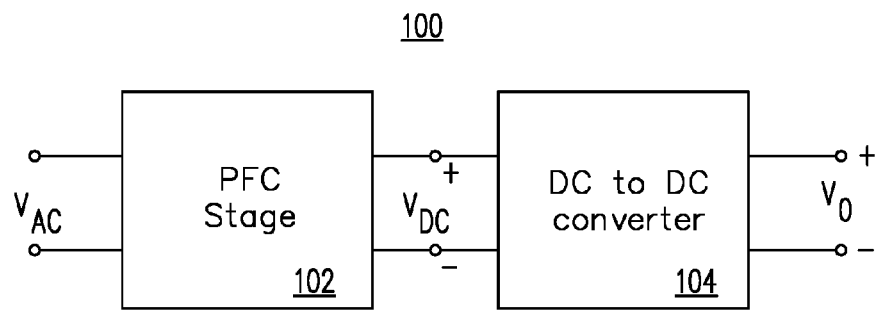
FIG. 1 illustrates a block schematic diagram of a two-stage, off-line power supply in accordance with an embodiment of the present invention.

The present invention is directed towards an improved switching power supply. In accordance with an embodiment of the present invention, an improved auxiliary power source is provided. A DC output of a switching power supply can be used as an auxiliary power source for providing power for control circuitry of the switching power supply. For example, in an off-line, two-stage switching power supply, one or more auxiliary DC outputs of the DC-to-DC converter stage can provide power to control circuitry of the PFC stage and to control circuitry of the DC-to-DC converter stage.

Upon start-up of the switching power supply, the PFC stage needs to generate its rectified output voltage, $V_{DC}$, and the DC-to-DC converter needs to generate a DC output before the DC output can be used as an auxiliary power source. During a start-up period before a DC output of the DC-to-DC converter stage is available for providing auxiliary power, the auxiliary power can be provided by an inductor that is coupled to the PFC main inductor. Specifically, upon commencement of switching in the PFC stage, a switched current through the PFC main inductor can be used to induce a current in a coupled inductor which can be used to generate auxiliary power. However, in some instances, switching in the PFC stage may cease prematurely. For example, when the AC input voltage applied to the PFC stage is unexpectedly high, this may cause the PFC stage to cease switching before sufficient auxiliary power is generated by the coupled inductor. This can occur if the AC input is higher than a target level set for the DC output of the PFC stage. The resulting lack of auxiliary power can cause the entire switching power converter to shut-down. For example, where the target level for the PFC output stage is 380 volts, and the AC input voltage is higher than 380 volts, this can result in a failure of the switching power supply to commence operation.

In accordance with an embodiment of the present invention, the target level for the PFC stage output, $V_{DC}$, is temporarily set to a level that is higher than its steady-state target level. For example, the steady-state target level for the PFC stage output can be 380 volts DC. Upon start-up of the switching power supply, the target level can be set to an elevated level, higher than 380 volts. For example, the initial elevated level can be 440 volts. If the AC input voltage is higher than 380 volts DC, but lower than 440 volts DC, then the switching power supply can be expected to successfully commence operation. The elevated target level is preferably set to a level higher than the expected range of AC input voltages. Once the power supply is up and running, the target level for the PFC output can be returned to its steady-state level. In this example, the level can be returned to 380 volts.

As described above, the PFC stage output can be configured for two different target levels; one for starting up the power supply and one for steady-state operation. In a further embodiment, the PFC stage can be configured for one or more additional target levels. For example, under light loading conditions, the PFC stage may operate more efficiently if its output voltage level is adjusted down. For example, the PFC can be configured for a third target level, lower than the first, for light load conditions. When the steady-state target level is 380 volts DC, this can also be the target level for "full load" conditions. However, under light load conditions, the target level can be reduced to approximately 342 volts DC.

In accordance with an embodiment of the present invention, a power factor correction (PFC) stage of a switching power supply is provided with power-saving modes of operation. The power-saving modes of operation are entered under light loading conditions. A light load condition can be sensed by monitoring a signal, VEAO, which is an error signal that is representative of a difference between the actual level of the output voltage, $V_{DC}$, and a desired level for the output voltage. Thus, the level of VEAO is also representative of input power to the PFC stage. In a first power-saving mode of operation for the PFC stage, a switching frequency for the PFC stage is reduced (e.g. from 67.5 kHz to 30 kHz). In a second power-saving mode of operation for the PFC stage, the PFC stage enters a "burst" or "kick" mode of operation, in which switching is halted between bursts of switching. In addition, while switching is halted in the second power-saving mode of operation, a bias circuit, which supplies operational power to the PFC stage, can provide reduced current to controller circuitry for the PFC stage. The first power-saving mode of operation is preferably entered when the level of VEAO falls below a first threshold (e.g. 0.75 volts). The PFC stage preferably stays in the first-power-saving mode of operation unless the level of VEAO rises above the first threshold by a hysteresis margin (e.g., 0.25 volts). The second power-saving mode of operation is preferably entered when the level of VEAO falls below a second threshold, lower than the first threshold (e.g. 0.5 volts).

When the level of VEAO falls below the second threshold, switching is halted until the level of VEAO rises above the second threshold; thus, switching is performed in bursts while the level of VEAO rises above and falls below the second threshold.

In accordance with an embodiment of the present invention, a DC-to-DC converter stage of a switching power supply is provided with a power-saving mode of operation. The power-saving mode of operation for the DC-to-DC converter stage is entered under light loading conditions. A light load condition can be sensed by monitoring a signal, IPLIMIT, which is representative of an output current of the DC-to-DC converter stage. The instantaneous level of IPLIMIT is representative of output current of the DC-to-DC stage, while an average level of IPLIMIT is representative of output power of the DC-to-DC stage. The instantaneous level of IPLIMIT is preferably monitored to detect an over-current condition, while an average level of IPLIMIT is preferably also monitored to detect a light load condition.

In the power-saving mode of operation for the DC-to-DC converter stage, a DC-to-DC converter "burst" or "kick" mode of operation is enabled. When in the kick mode, a feedback signal VFB, which is representative of an output voltage of the DC-to-DC converter stage, falls below a threshold (e.g., 2.495 volts), switching of the DC-to-DC converter stage is enabled. When the feedback signal rises above the threshold by a hysteresis margin (e.g., 0.01 volts), then switching is disabled; thus, switching is performed in bursts while the level of VFB rises above and falls below the threshold. In addition, when the DC-to-DC converter is not in kick mode, the output voltage is preferably regulated using frequency modulation. When the DC-to-DC converter is in kick mode, the switching frequency is preferably held constant during switching bursts. Thus, the output voltage is regulated by varying the duration of the switching bursts as compared to periods between bursts when switching is halted. The constant switching frequency employed during switching bursts while the Dc-to-DC converter stage is in kick mode is preferably user selectable. For example, where the DC-to-DC converter stage is a resonant converter, the kick mode switching frequency can be set at: the resonant frequency; twice the resonant frequency; or three times the resonant frequency.

FIG. 1 illustrates a block schematic diagram of a two-stage, off-line power supply 100 in accordance with an embodiment of the present invention. As shown in FIG. 1, a power factor correction (PFC) stage 102 has an input coupled to alternating-current (AC) source $V_{AC}$. The PFC stage 102 performs rectification on the AC input signal and maintains current drawn from the AC source substantially in phase with the AC voltage so that the power supply 100 appears as a resistive load to the AC source.

The PFC stage 102 generates a loosely regulated voltage, $V_{DC}$, which is provided as input to a DC-to-DC converter 104. Using the input $V_{DC}$, the DC-to-DC converter stage 104 generates a voltage-regulated, DC output, $V_O$, which can be used to power a load. The level of $V_{DC}$ is preferably at a higher voltage and is more loosely regulated than the output $V_O$ of the DC-to-DC converter stage 104. The nominal level of the output, $V_{DC}$, of the PFC stage 102 may be, for example, approximately 380 volts DC, while the voltage-regulated output $V_O$ of the DC-to-DC converter stage 104 may be, for example, approximately 12.0 volts DC.

Figure 2:
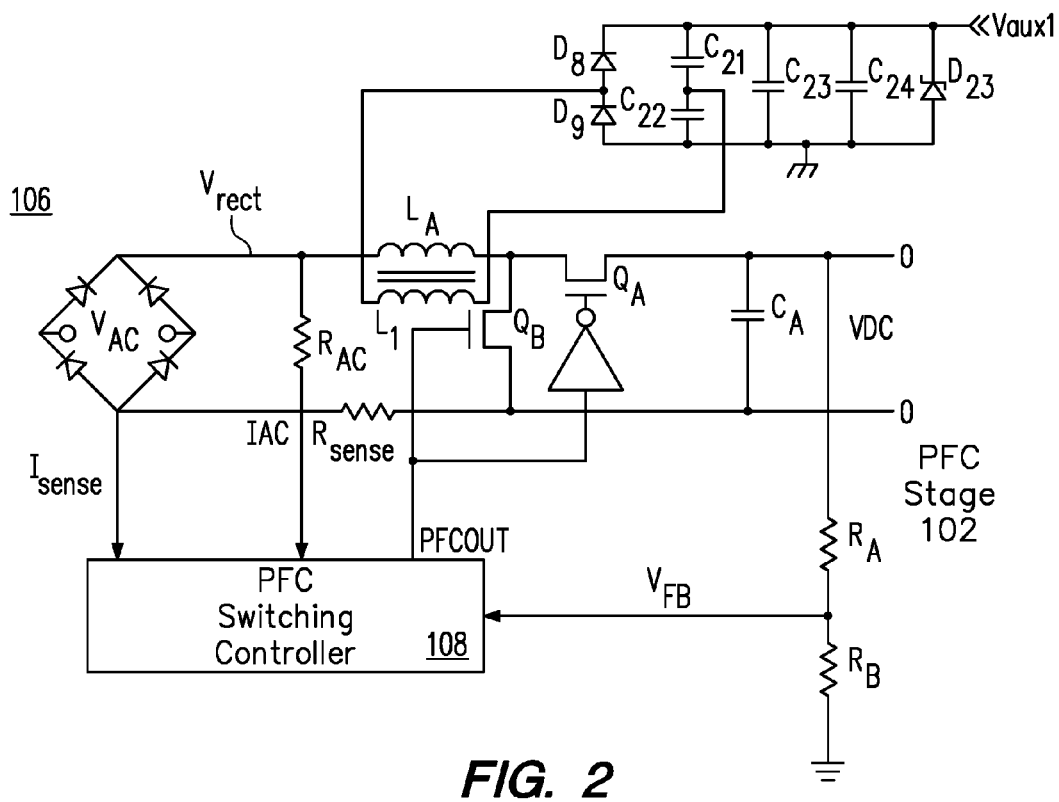
FIG. 2 illustrates a schematic diagram of a power factor correction circuit in accordance with an embodiment of the present invention.

FIG. 2 illustrates a schematic diagram of a power factor correction (PFC) circuit 102 in accordance with an embodiment of the present invention. An alternating-current (AC) input source $V_{AC}$ is coupled across input terminals of a bridge rectifier 106. A rectified input voltage signal Vrect is formed at a first output terminal of the rectifier 106 and is coupled to a first terminal of a main PFC inductor $L_A$ and to a first terminal of a resistor $R_{AC}$. A second terminal of the inductor $L_A$ is coupled to a first terminal of a transistor switch $Q_A$ and to a first terminal of a transistor switch $Q_B$. A second terminal of the switch $Q_B$ is coupled to a first terminal of an output capacitor $C_A$. A second terminal of the switch $Q_A$ and a second terminal of the capacitor $C_A$ are coupled to a ground node.

A second terminal of the resistor $R_{AC}$ is coupled to a voltage sensing input of a PFC switching controller 108. A voltage sensing current signal $I_{AC}$ which is representative of the rectified input voltage Vrect flows through the resistor $R_{AC}$ and is received by the controller 108. A second output terminal of the bridge rectifier 106 is coupled to a current sensing input of the controller 108 and to a first terminal of a resistor Rsense. A second terminal of the resistor Rsense is coupled to the ground node. A signal Isense that is representative of the current input to the power factor correction circuit 102 is received by the controller 108.

An output voltage sensing signal VFB is formed by a resistor $R_A$ having a first terminal coupled to the output voltage $V_{DC}$ and a second terminal coupled to a first terminal of resistor $R_B$. A second terminal of the resistor $R_B$ may be coupled a ground node. The resistors $R_A$ and $R_B$ form a voltage divider in which the signal VFB is formed at the node between the resistors $R_A$ and $R_B$. The signal VFB is representative of the output voltage $V_{DC}$.

The PFC switching controller 108 generates a signal $PFC_{OUT}$ which controls the opening and closing of the switches $Q_A$ and $Q_B$ so as to regulate the intermediate output voltage $V_{DC}$ while maintaining the input current in phase with the input voltage $V_{AC}$. To accomplish this, the controller 108 uses the signal VFB, as well as the input current and voltage sensing signals $I_{AC}$ and Isense. The switches $Q_A$ and $Q_B$ are operated such that when one is opened, the other is closed.

An inductor $L_1$ is inductively coupled to the main PFC inductor $L_A$. As described above, operation of the switches $Q_A$ and $Q_B$ causes current to flow in the inductor $L_A$. This also induces a current in the inductor $L_1$. This induced current is rectified by diodes $D_1$ and $D_2$ and charges capacitors $C_{21}$, $C_{22}$, $C_{23}$ and $C_{24}$ to form a DC auxiliary power supply voltage Vaux1. A Zener diode $D_{23}$ limits Vaux1, for example, to a maximum level of 35 volts. The auxiliary power supply voltage Vaux1 can provide power to operate the circuitry of the power supply, for example, a controller for the DC-to-DC converter stage 104.

Figure 3:
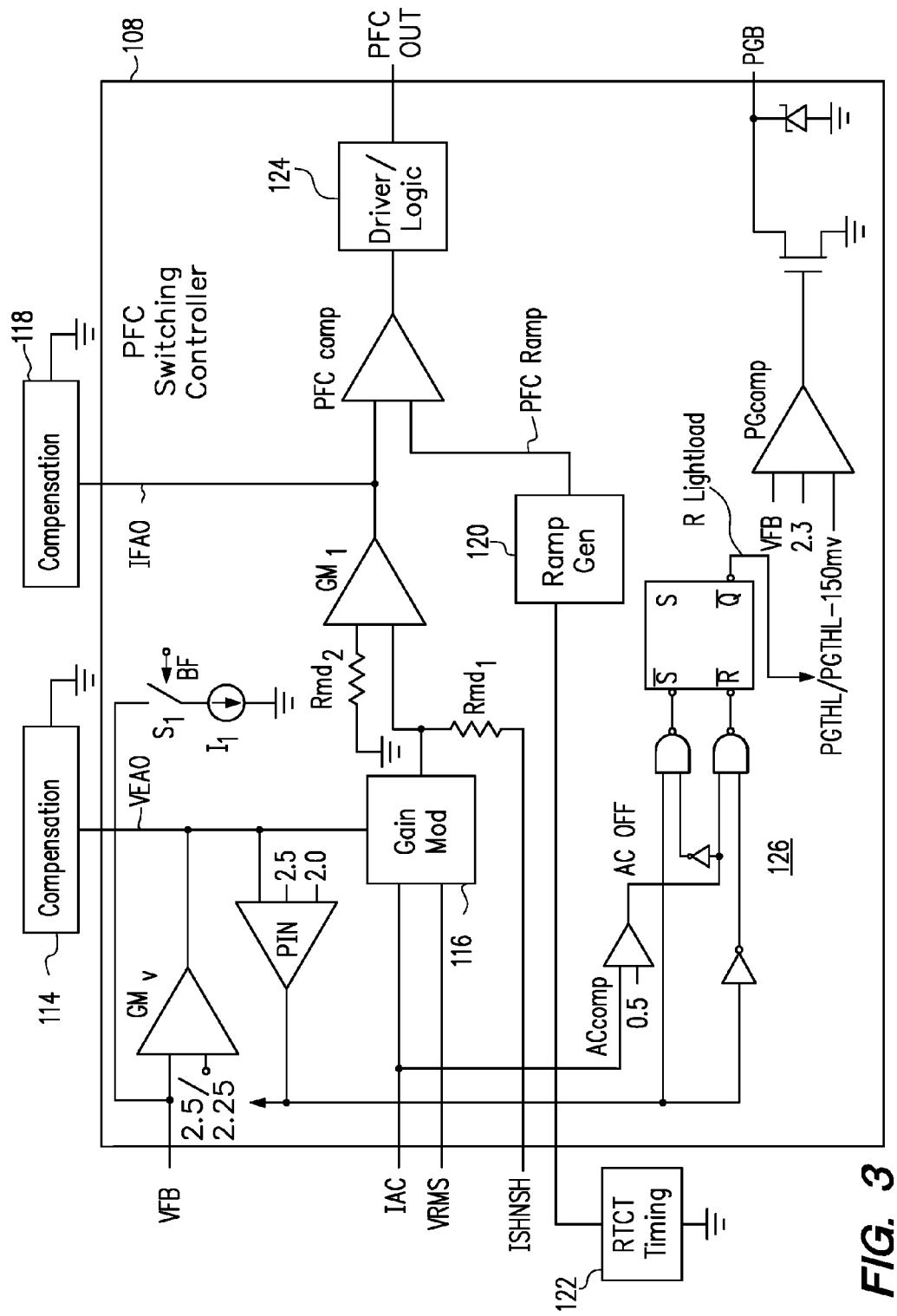
FIG. 3 illustrates a block schematic diagram of a controller for a power factor correction circuit in accordance with an embodiment of the present invention.

FIG. 3 illustrates a block schematic diagram of the PFC switching controller 108 in more detail in accordance with an embodiment of the present invention. Within the controller 108, the signal VFB is coupled to a first input terminal of a transconductance error amplifier GMv. A second input of the error amplifier GMv is coupled to a reference voltage that is representative of a desired level for the output voltage $V_{DC}$. This reference voltage may be 2.25 volts or 2.5 volts, depending upon the output level of a comparator PIN. An output of the error amplifier GMv forms a signal VEAO, which is an error signal that is representative of a difference between the actual level of the output voltage $V_{DC}$ and a desired level for the output voltage. As shown in FIG. 3, the error signal VEAO is formed across a compensation circuit 114.

In an embodiment, the reference voltage of 2.5 volts corresponds to a target level of 380 volts DC for the PFC output $V_{DC}$, while the reference voltage of 2.25 corresponds to a target level of 342 volts DC for the PFC output $V_{DC}$. It will be apparent that different levels can be selected, for example, by changing the reference voltage levels.

As shown in FIG. 3, the feedback signal VFB at the first input terminal of the transconductance error amplifier GMv is also coupled to a controllable or switched current source. More particularly, the feedback signal VFB is coupled to a first terminal of a switch $S_1$. A second terminal of the switch $S_1$ is coupled to a first terminal current source $I_1$. A second terminal of the current source $I_1$ is coupled to a ground node. When the switch $S_1$ is closed, a current passes through the current source $I_1$ which lowers the voltage level of VFB. This voltage drop is caused by the current being pulled through the feedback resistor $R_A$ (FIG. 2). As a result, the target level for the PFC output $V_{DC}$ is increased. The current source $I_1$ can be activated upon start-up of the power supply and deactivated during steady-state operation.

The switch $S_1$ can be activated by a signal BF, described in more detail in connection with FIG. 4A-D. The signal BF preferably closes the switch $S_1$, and thereby activates the current source $I_1$, upon start-up of the power supply. The signal BF also preferably opens the switch $S_1$, and thereby disables the current source $I_1$, during steady-state operation of the power supply.

In an embodiment, the target level for $V_{DC}$ is increased to 440 volts during start up. In this example, $R_A$ can be 6.0 mega-ohms while the current source $I_1$ can be 10 micro-amps; in this case, the increase to $V_{DC}$ is 60 volts (6.0 MΩ X 10 uA=60 volts). It will be apparent that a different level for $V_{DC}$ can be selected. For example, different values for $R_A$ and $I_1$ can be selected. As a another specific example, $R_A$ can be set to 20 MΩ so that the increase to $V_{DC}$ is 200 volts (20.0 MΩ X 10 uA=200 volts); in this case, the initial target level for $V_{DC}$ can be 580 volts (380 volts+200 volts=580 volts).

The comparator PIN determines whether the PFC circuit 102 is operating under light load conditions or heavy loading conditions (i.e. loading conditions other than light load) according to the level of the error signal VEAO. When the level of the error signal VEAO is less than 2.0 volts, this indicates light load conditions; in this case, the output of the comparator PIN is a logic low voltage. If the level of the error signal VEAO then exceeds 2.5 volts, this indicates heavy loading conditions; in this case, the output of the comparator PIN changes to a logic high voltage. If level of the error signal VEAO then falls below 2.0 volts, this again indicates light load conditions; in this case, the output of the comparator PIN changes back to a logic low voltage. Thus, the comparator PIN preferably operates with hysteresis to inhibit its output from transitioning under slight changes in loading. The output of the comparator PIN is a signal labeled "Heavy Load." In this way, the state of the load can be determined by monitoring for changes in the level of $V_{DC}$. More particularly, the state of the load can be determined by monitoring the error signal VEAO.

When the output of the comparator PIN is a logic high voltage (heavy loading), the reference voltage coupled to the error amplifier GMv is 2.5 volts, which causes the output voltage VDC to be regulated at approximately 380 volts DC. When the output of the comparator PIN is a logic low voltage (light loading), the reference voltage coupled to the error amplifier GMv is preferably 2.25 volts, which causes the output voltage $V_{DC}$ to be regulated at approximately 342 volts DC. Thus, the level at which $V_{DC}$ is regulated by the PFC stage 102 can be different depending upon the loading.

A gain modulation block 116 receives the error signal VEAO, as well as the signal IAC and a signal VRMS for generating a modulated error signal Imu1. The signals VEAO and IAC are described above. The signal VRMS is representative of the level of the AC line voltage and is used to inhibit switching in the PFC stage 102, by gradually pulling down the level of the error signal VEAO, if the AC line voltage is too low for an extended period (i.e. under "brown out" conditions).

The output of the gain modulation block 116 is coupled to a first input terminal of a transconductance amplifier GMi and to a first terminal of a resistor Rmul1. A second terminal of the resistor Rmul1 is coupled to receive the signal Isense. A first terminal of a resistor Rmul2 is coupled to a second input terminal of the amplifier GMi. A second terminal of a resistor Rmul2 is coupled to a ground node.

An output of the amplifier GMi is coupled to a compensation circuit 118. A signal IEAO is formed at the output of the amplifier GMi. The signal IEAO is representative of the error signal VEAO as well as the input voltage and current to the PFC stage. The signal IEAO is coupled to a first input of the comparator PFCcomp. An output of a ramp generator 120 forms a ramp signal PFC ramp which is coupled to a second terminal of the comparator PFCcomp. An RTCT node of the ramp generator 120 is coupled to an RTCT timing network 122 which sets the frequency of the ramp signal.

An output of the comparator PFCcomp is coupled to driver/logic block 124 which includes driver and logic circuit elements for forming the PFC switching signal PFCOUT. The PFC switching signal is generated in accordance with pulse width modulation (PWM) to regulate the PFC output voltage $V_{DC}$. It will be apparent that the PFC function and control of switching in the PFC stage 102 can be accomplished in other ways and by employing different circuit arrangements.

The signal IAC is coupled to a first input of a comparator ACcomp while a reference voltage of 0.5 volts is coupled a second input of the comparator ACcomp. The comparator ACcomp generates a signal ACOFF at its output, which indicates whether the input voltage has fallen below a minimum threshold. Logic 126 combines the signal ACOFF with the signal at the output of the comparator PIN to form a signal R Light Load ("Remember Light Load"). The signal R Light Load is a logic signal that indicates the state of the signal when the signal IAC is above its minimum threshold and saves its state whenever the signal IAC falls below its minimum threshold as detected by the comparator ACcomp. In other words, the logic 126 remembers (by holding the state of the signal R Light Load) whether power converter 100 was under light or heavy loading conditions at the time that the AC input signal is lost.

The signal R Light Load is used to adjust the level of a threshold voltage applied to a power gate comparator PGcomp. More particularly, a first input of the comparator PGcomp is coupled to receive the feedback signal VFB. A second input of the comparator PGcomp is coupled to receive a first reference voltage of 2.3 volts and a third input is coupled to receive a second reference voltage. The level of the second reference voltage changes dependent upon the level of the signal R Light Load. More particularly, a reference voltage PGTHL is coupled to the third input of the comparator when R Light Load indicates that the power converter 100 was under heavy loading conditions at the time that the AC input signal is lost; and, a reference voltage PGTHL −150 mV is coupled to the third input of the comparator when R Light Load indicates that the power converter 100 was under light loading conditions at the time that the AC input signal is lost. The level of PGTHL may be set to 2.0 volts so that the second reference voltage is 2.0 or 1.85 volts depending on the level of R Light Load.

The output of the comparator PGcomp is coupled to the DC-to-DC converter 104 (FIG. 3) to selectively disable switching in the DC-to-DC converter 104 via the signal PGB (also shown in FIG. 3). More particularly, immediately upon start-up of the PFC stage, the level of VFB is low and begins to rise. While the level of VFB is below 2.3 volts, the level of PGB is a logic high voltage, which causes switching in the DC-to-DC converter to be disabled. Once the level of VFB the surpasses the level of the first reference voltage (e.g. 2.3 volts), this causes the level of PGB to change to a logic low voltage, which causes switching in the DC-to-DC converter to be enabled. Then, for the level of PGB to change again to a logic high voltage, the level of VFB needs to fall below the level of the second reference voltage. The level of the second reference voltage can be equal to 2.0 volts (PGTHL) or 1.85 volts (PGTHL −150 Mv), depending upon the level of R Light Load.

Thus, switching in the in the DC-to-DC converter is disabled under different conditions, which conditions depend upon the state of the load at the time the line voltage was lost. More particularly, when the power converter 100 is operating under heavy loading conditions, the level of VFB is regulated to 2.5 volts and the second reference voltage at the comparator PGcomp is 2.0 volts. If the AC line voltage is then lost, the level of VFB will begin to fall; in this case, it will need to fall from 2.5 volts to 2.0 volts before the output of the comparator PGcomp causes the signal PGB to disable switching in the DC-to-DC converter 104. However, when the power converter 100 is operating under light load, the level of VFB is regulated to 2.25 volts and the second reference voltage at the comparator PGcomp can be 1.85 volts; if the AC line voltage is then lost, the level of VFB will begin to fall; in this case, it will need to fall from 2.25 volts to 1.85 volts before the output of the comparator PGcomp causes the signal PGB to disable switching in the DC-to-DC converter 104. In this way, the hold-up time for power loss under heavy loading conditions is controlled differently the hold-up time for power loss under light loading conditions. Because the hold-up times are controlled differently, differences in the way the power supply operates under light or heavy loads can be compensated so that the hold-up times are of a desired duration. The disabling of the switching can be performed such that the hold-up times are approximately the same for both light and heavy loads. This is because the time required for the level of VFB to fall from 2.5 volts to 2.0 volts under heavy loading conditions is expected to be approximately the same as the time required for the level of VFB to fall from 2.25 volts to 1.85 volts under light loading conditions. Alternatively, the disabling of the switching can be performed such that the hold-up times are different for light and heavy loads.

FIG. 4A-D illustrates a detailed schematic diagram of a PFC converter and PFC controller in accordance with an embodiment of the present invention. FIG. 4A-D shows circuitry that can be used to generate the signal BF, described above in connection with FIG. 3. As shown in FIG. 4A-D, a soft-start signal ISOFT is generated by charging a capacitor $C_{15}$ with a current source $I_2$ upon start-up of the switching power supply. More particularly, switches $S_2$ and $S_3$ are initially closed. When a reference voltage Vref rises to a predetermined level, the switch $S_2$ is opened. When an AC input voltage is detected, the switch $S_3$ is opened. When the switches $S_2$ and $S_3$ are open, a voltage across the capacitor $C_{15}$ slowly rises. While the voltage across $C_{15}$ rises, the switch $S_1$ is held closed by a comparator DISBF, which sets the target level of the PFC output $V_{DC}$ to its higher, initial level for start-up (e.g., 440 volts DC). When the voltage across C15 rises to 7.5 volts, the comparator DISBF opens the switch S1 which sets the target level of the PFC output $V_{DC}$ to its lower, steady-state level (e.g. 380 volts). The comparator DISBF preferably has hysteresis so as to prevent oscillation in the signal BF.

Also shown in FIG. 4A-D is a first "super light load" detector/comparator 136. The comparator 136 receives as inputs the signal VEAO and a first reference voltage (e.g. 0.75 volts). The comparator 136 compares the level of VEAO with the first reference voltage to enter a first power-saving mode of operation for the PFC stage. In the first power-saving mode of operation for the PFC stage, a switching frequency for the PFC stage is reduced (e.g. from 67.5 kHz to 30 kHz). Thus, as shown in FIG. 4A-D, the output of the comparator 136 is coupled to an oscillator 138 of the PFC controller 108. The oscillator 138 controls the switching frequency of the PFC stage based on level of the logic signal from the comparator 136. The first power-saving mode of operation is preferably entered when the level of VEAO falls below a first threshold (e.g. 0.75 volts). The PFC stage preferably stays in the first-power-saving mode of operation unless the level of VEAO rises above the first threshold by a hysteresis margin (e.g., 0.25 volts). Accordingly, the PFC stage preferably leaves the first power-saving mode once the level of VEAO rises above 1.0 volts. Thus, the comparator preferably compares the level of VEAO with the reference voltage with hysteresis.

Also shown in FIG. 4A-D is a second "super light load" detector/comparator 140. The comparator 140 receives as inputs the signal VEAO and a second reference voltage (e.g. 0.50 volts). The comparator 140 compares the level of VEAO with the second reference voltage to enter a second power-saving mode of operation for the PFC stage. In the second power-saving mode of operation for the PFC stage, the PFC stage enters a "burst" or "kick" mode of operation, in which switching is halted between bursts of switching. Thus, the output of the comparator 140 is coupled to switching logic 142 of the PFC stage to disable switching in the PFC stage when the level of VEAO falls below the second reference. The switching frequency for the bursts in the second power-saving mode can be the same reduced frequency as is employed in the first power-saving mode (e.g. 30 kHz).

In addition, while switching is halted in the second power-saving mode of operation, a bias circuit 144, which supplies operational power to the PFC stage, can provide reduced current to the PFC stage controller 108 circuitry.

The second power-saving mode of operation is preferably entered when the level of VEAO falls below the second threshold, lower than the first threshold. When the level of VEAO falls below the second threshold, switching is halted until the level of VEAO rises above the second threshold. Thus, switching is performed in bursts while the level of VEAO rises above and falls below the second threshold.

Also shown in FIG. 4A-D is a photo-couple 146 that provides a control signal CSS (also shown in FIG. 7A-D) from the PFC stage 102 to the DC-to-DC converter stage 104. The control signal CSS is generated in response to the signal PGB (discussed herein) so as to enable or disable switching in the DC-to-DC converter stage 104. When the signal PGB is activated, an output current IPGB is also activated; the current IPGB in the photo-couple 146 disables switching in the DC-to-DC converter stage 104. Conversely, when the signal PGB is de-activated, an output current IPGB is also de-activated; the lack of the current IPGB in the photo-couple 146 enables switching in the DC-to-DC converter stage 104.

Figure 5:
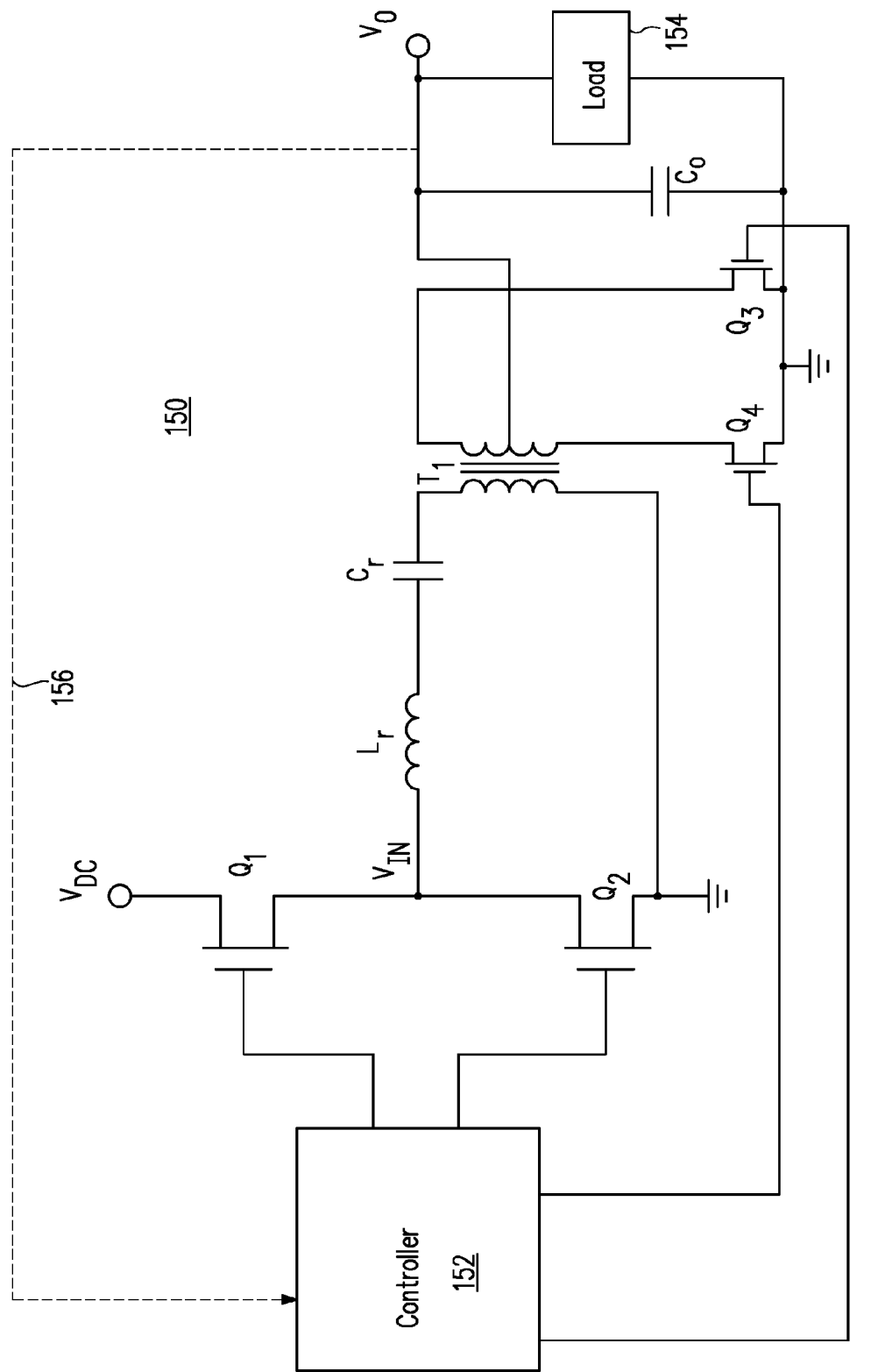
FIG. 5 illustrates a schematic diagram of a resonant switching converter in accordance with an embodiment of the present invention.

FIG. 5 illustrates a schematic diagram of a resonant switching converter 150 in accordance with an embodiment of the present invention. The resonant switching converter 150 may be, for example, included in the DC-to-DC converter 104 of FIG. 1. Referring to FIG. 5, the converter 150 includes a half-bridge switching inverter that includes a pair of series-connected transistor switches $Q_1$ and $Q_2$. A power source, such as the output $V_{DC}$ generated by the PFC stage 102 (FIG. 1), is coupled to a first terminal of the transistor switch $Q_1$. A second terminal of the transistor switch $Q_1$ is coupled to a first terminal of a transistor switch $Q_2$ to form an intermediate node. The second terminal of the transistor switch $Q_2$ is coupled to a ground node. A control terminal of each of the transistor switches $Q_1$ and $Q_2$ is coupled to a controller 152. The controller 152 controls opening and closing of the pair of transistor switches $Q_1$ and $Q_2$. When the switch $Q_1$ is closed and the switch $Q_2$ is open, the intermediate node is coupled to $V_{DC}$. This raises a voltage, VIN, at the intermediate node. When the switch $Q_1$ is open and the switch $Q_2$ is closed, the intermediate node is coupled to ground. This lowers the voltage, VIN, at the intermediate node. While FIG. 2 shows a half-bridge switching inverter, it can be replaced with a full-bridge switching inverter.

Energy storage elements are coupled to the intermediate node. Particularly, as shown in FIG. 5, a first terminal of an inductor $L_r$ is coupled to the intermediate node. A second terminal of the inductor $L_r$ is coupled to a first terminal of a capacitor $C_r$. The energy storage elements, $L_r$ and $C_r$, form a series resonant tank. The resonant tank is charged with energy by raising and lowering the voltage VIN at the intermediate node. A second terminal of the capacitor $C_r$ is coupled to a first terminal of a primary winding of a transformer $T_1$. A second terminal of the primary winding of the transformer $T_1$ is coupled to a ground node. A first terminal of a secondary winding of the transformer $T_1$ is coupled to a first terminal of a transistor switch $Q_3$. A second terminal of the secondary winding of the transformer $T_1$ is coupled to a first terminal of a transistor switch $Q_4$. A second terminal of the transistor switch $Q_3$ and a second terminal of the transistor switch $Q_4$ are coupled to a ground node. A control terminal of each of the transistor switches $Q_3$ and $Q_4$ is coupled to the controller 152. The controller 152 controls opening and closing of the pair of transistor switches $Q_3$ and $Q_4$.

A center tap of the secondary winding of the transformer $T_1$ is coupled to a first terminal of a capacitor $C_O$. A second terminal of the capacitor $C_O$ is coupled to a ground node. An output voltage, $V_O$, is formed across the capacitor $C_O$. A load 154 may be coupled across the capacitor $C_O$ to receive the output voltage $V_O$. The output voltage $V_O$, or a voltage that is representative of the output voltage, is fed back to the controller 152 via a feedback path 156.

Adjusting the switching frequency of the transistor switches $Q_1$ and $Q_2$ adjusts impedance of the resonant tank and, therefore, adjusts the amount of power delivered to the load 154. More particularly, decreasing the switching frequency tends to increase the power delivered to the load 154. Increasing the switching frequency tends to reduce the power delivered to the load 154. By monitoring the level of the output voltage $V_O$ via a feedback path 156, the controller 152 can adjust the switching frequency to maintain the output voltage $V_O$ constant despite changes in the power requirements of the load 154 and despite changes in the level of the input $V_{DC}$. This is referred to as frequency modulation or FM modulation.

As power is transferred to the load 154 via the transformer $T_1$, current through the secondary winding of the transformer $T_1$ alternates in direction. The transistor switches $Q_3$ and $Q_4$ perform synchronous rectification. This is accomplished by the controller 152 turning the transistor switches $Q_3$ and $Q_4$ on and off at appropriate times so that the current through each of the switches $Q_3$ and $Q_4$ is in one direction only. Generally, the transistor switch $Q_3$ is on while the transistor switch $Q_4$ is off. Similarly, the transistor switch $Q_4$ is on while the transistor switch $Q_3$ is off. Synchronous rectification ensures that power is delivered to the load 154 and prevents reverse currents which could be reflected to the resonant tank. Such reverse current could result in unwanted oscillations, intractable behavior and device failure.

Figure 4A:
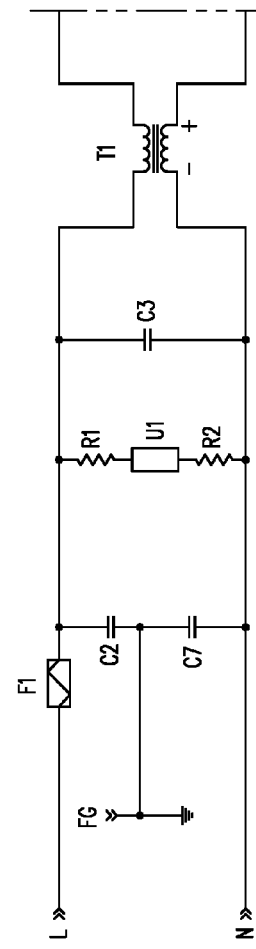
FIG. 4A-D illustrates a detailed schematic diagram of a PFC converter and PFC controller in accordance with an embodiment of the present invention.
Figure 4:
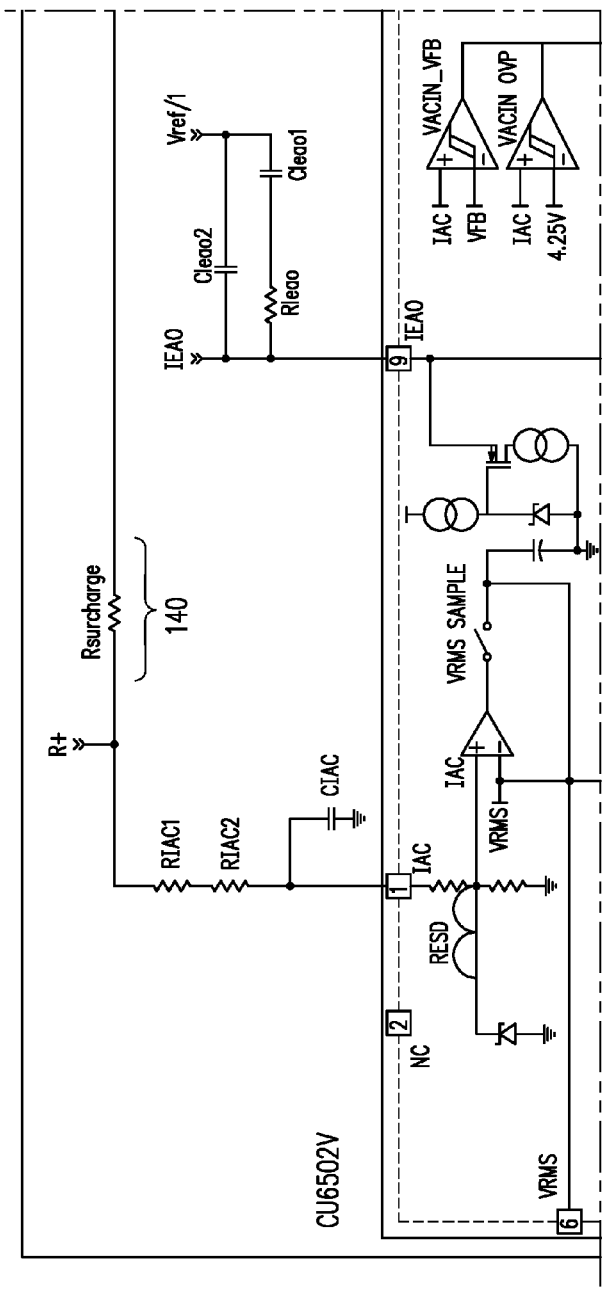
Figure 4B:
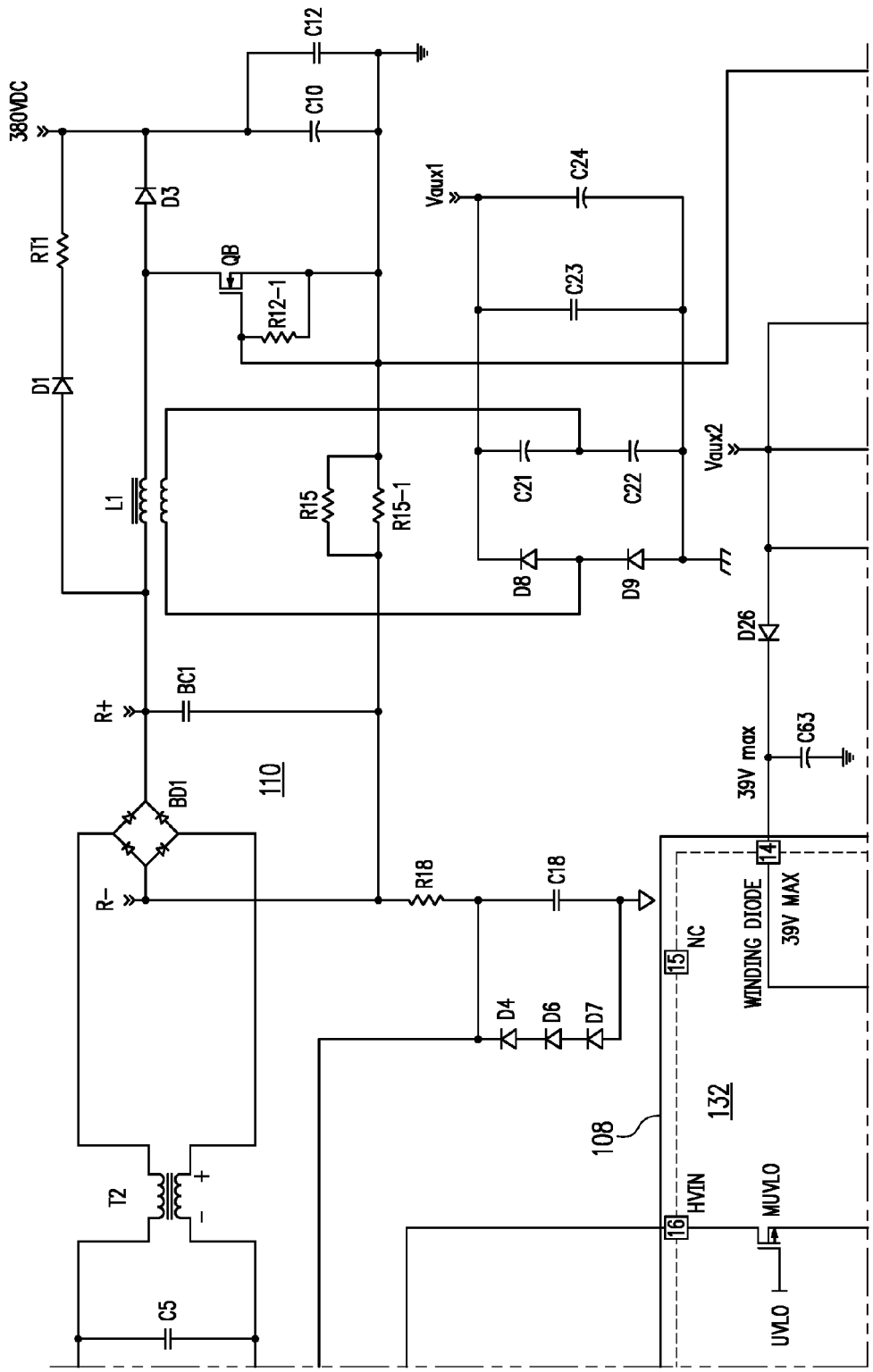
Figure 4C:
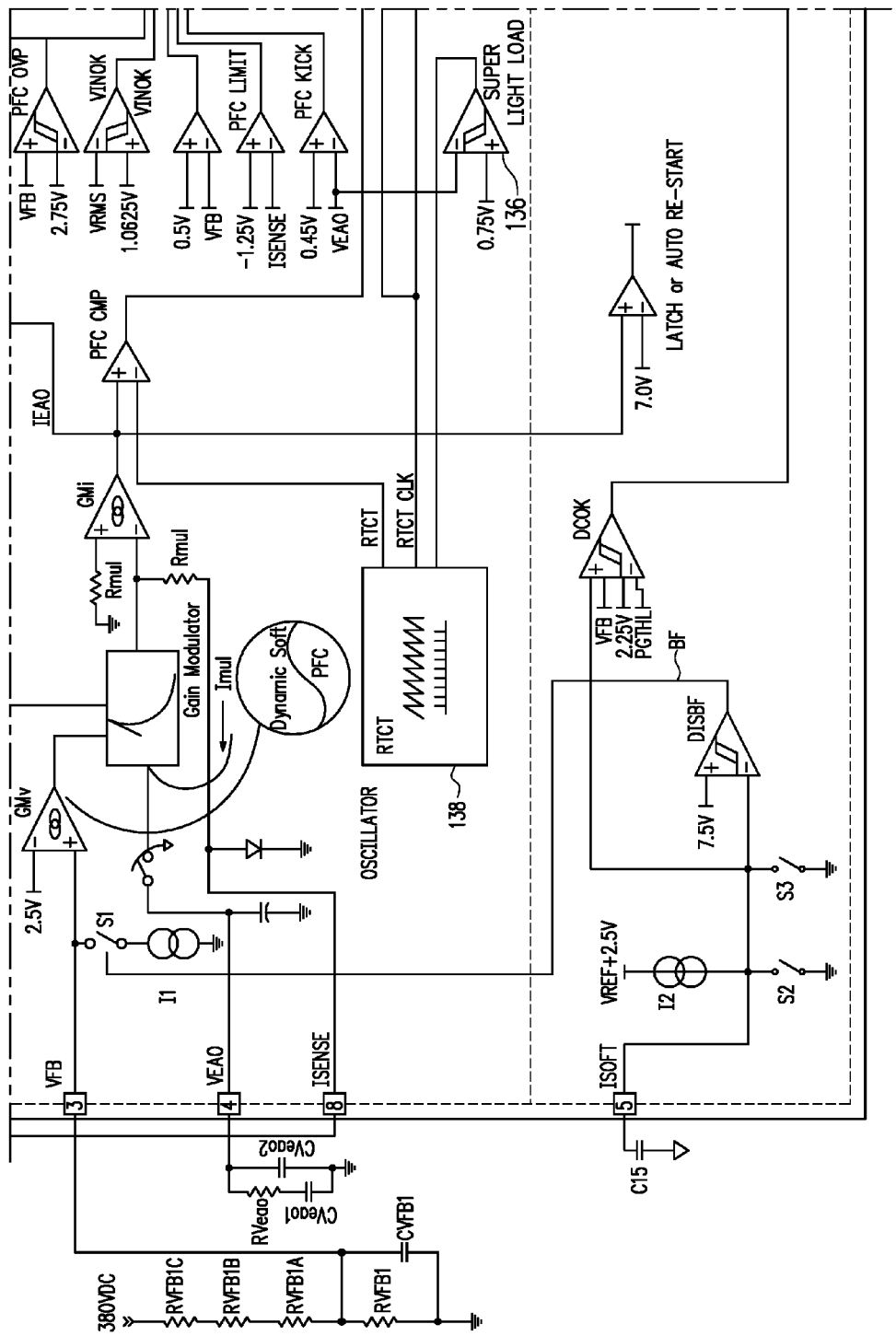
Figure 4D:
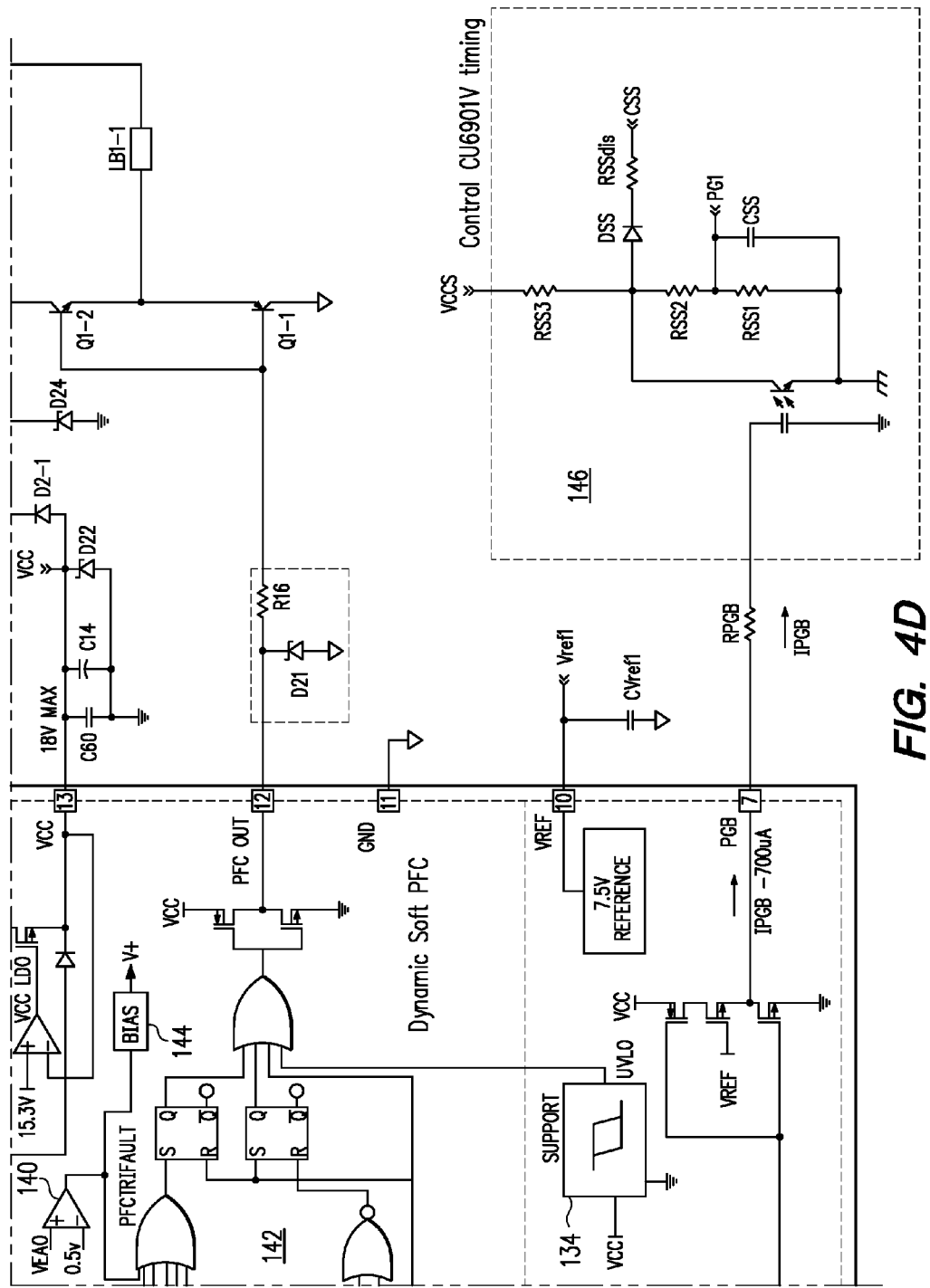

As described herein, the inductor $L_1$ coupled to the main PFC inductor $L_A$ is used to generate auxiliary power during start-up (see e.g., FIGS. 2 and 4). This power is used to operate control circuitry of the power supply, such as the DC-to-DC converter controller 152. In accordance with a further aspect of the present invention, it is desired to inhibit drawing power in this manner after start-up. This is desirable in order to increase efficiency. Rather, during steady state operation, it is desired to draw power from an auxiliary output of the DC-to-DC converter stage 104 in order to provide power to control circuitry of the power supply.

Figure 6:
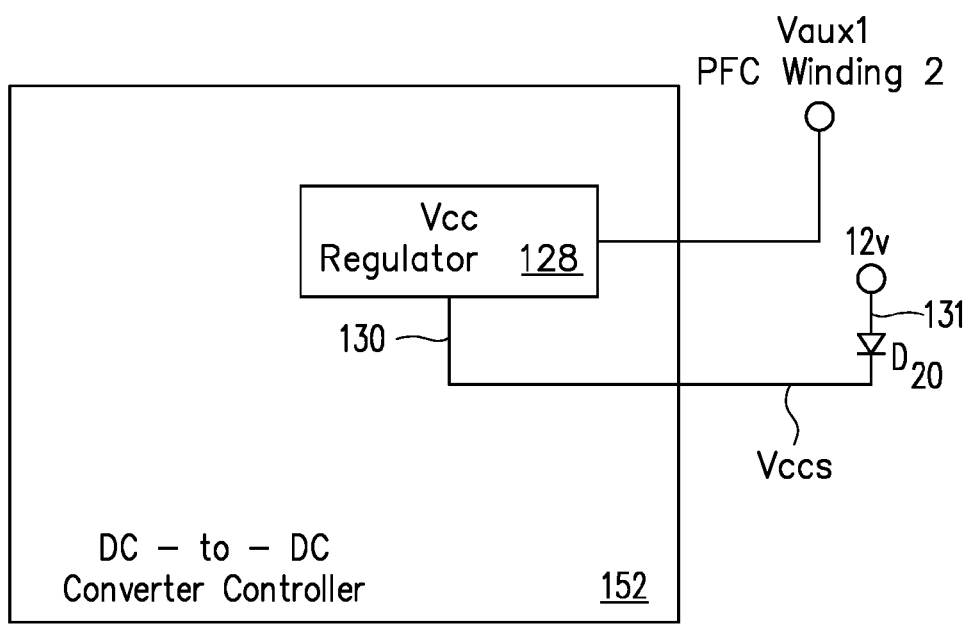
FIG. 6 illustrates a voltage regulator for a power supply controller in accordance with an embodiment of the present invention.
Figure 7B:
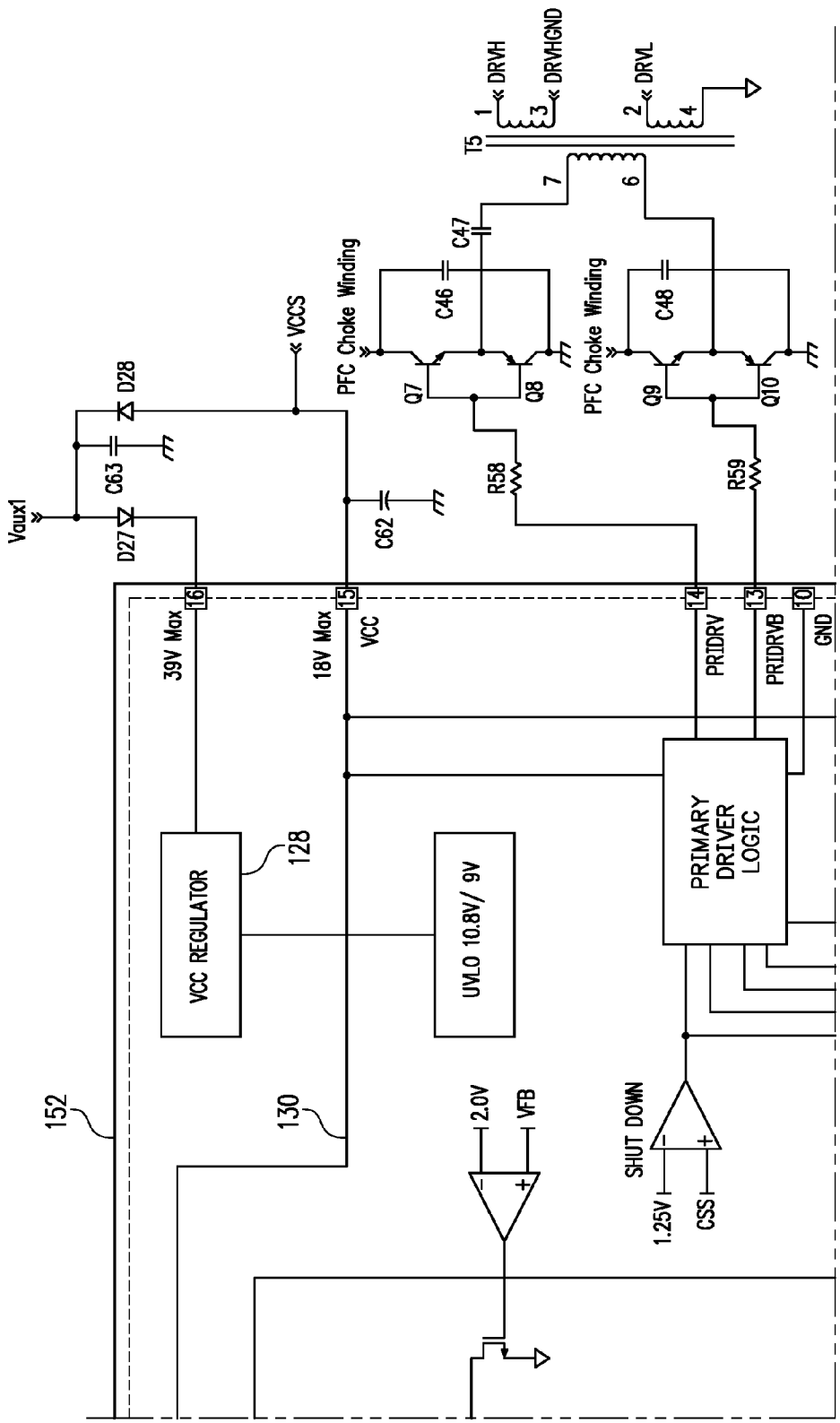
Figure 7C:
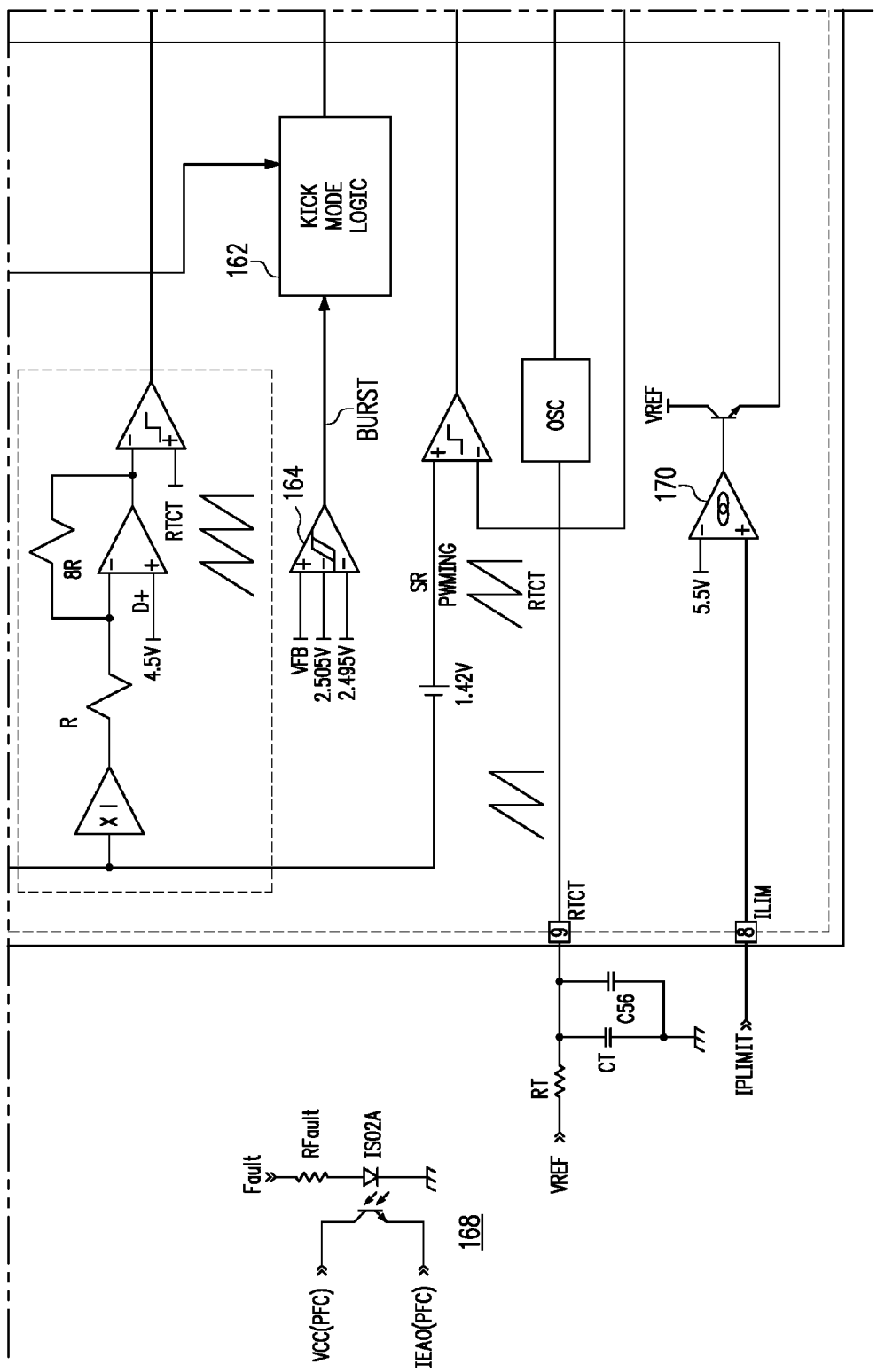
Figure 7D:
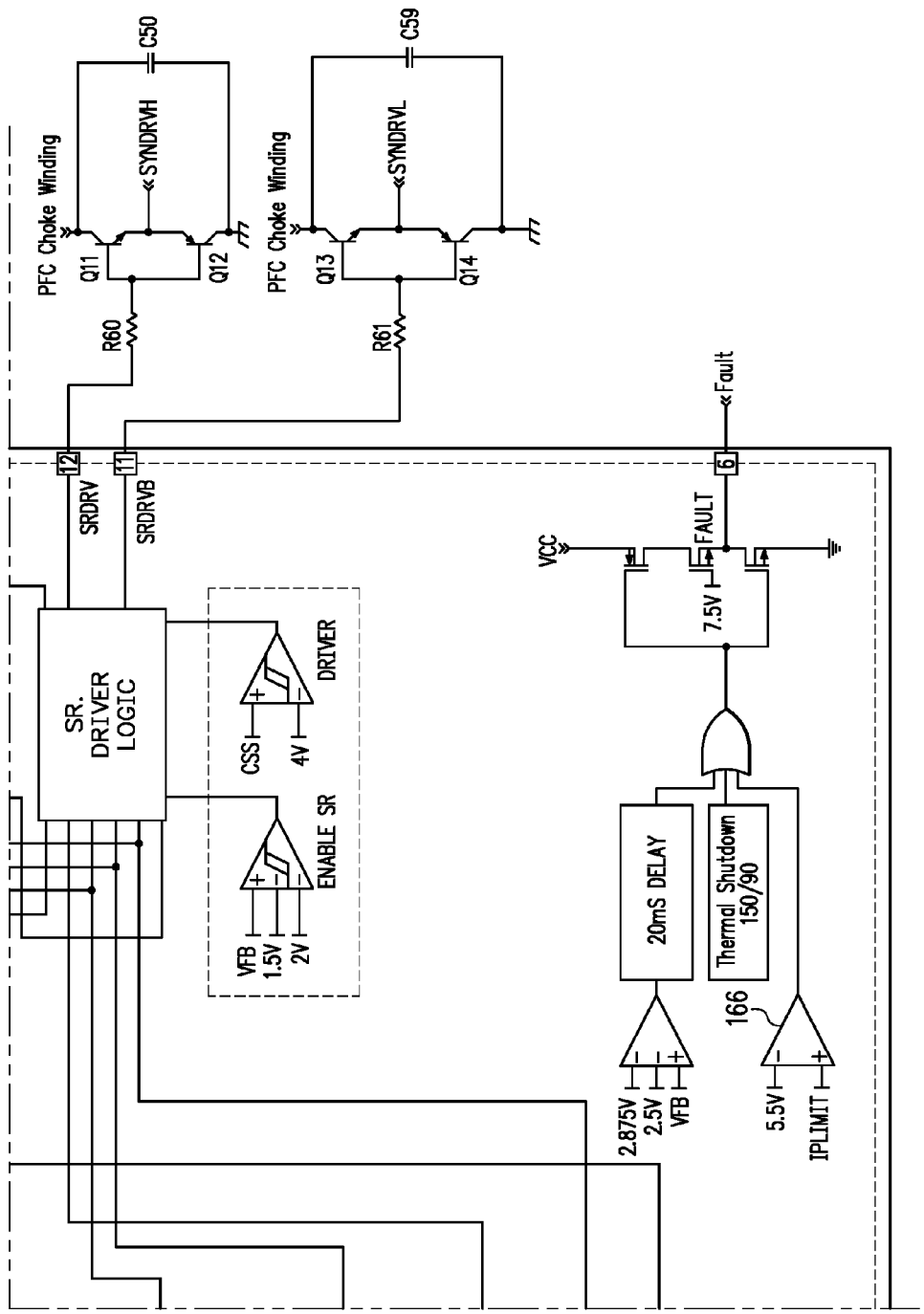

FIG. 6 illustrates a voltage regulator for a power supply controller in accordance with an embodiment of the present invention. As shown in FIG. 6, the DC-to-DC converter controller 152 can include a voltage regulator 128, such as a low dropout regulator (LDO). The auxiliary voltage Vaux1 (FIG. 2) can be coupled to an input of the regulator 128. The regulator 128 generates at its output 130 a voltage-regulated output signal VCCS. VCCS can be regulated at of level of 11.0 volts, for example. This voltage regulated output VCCS can be used to supply power to circuitry of the controller 152 and possibly other circuitry of the power supply. An output 131 (also referred to as "$V_O$") can be generated as an auxiliary output of the DC-to-DC converter stage 104 of the power supply. The level of the output 131 can be regulated to 12.0 volts, for example. The regulated output 131 of the DC-to-DC converter state 104 can be coupled to the output 130 of the voltage regulator 128 through a Schottky diode $D_{20}$.

During start-up, power for control circuitry 108 can be provided by the regulator 128 (via its VCCS output). As shown in FIGS. 2 and 4, start-up power is derived from the main PFC inductor (via the signal Vaux1). However, once the power supply reaches steady-state, then the DC-to-DC converter stage 104 begins generating and regulating its output 131. In the example, the level of the regulator output 131 is 12.0 volts or higher whereas the level of VCCS is regulated at 11.0. Once the level of the output 131 exceeds the level of the regulator 128 output VCCS by a diode voltage drop (across the diode $D_{20}$), then the output 130 of the regulator 128 will be pulled higher than its regulated level. This condition automatically shuts off the regulator 128 such that it ceases drawing power from Vaux1.

In the example, the DC-to-DC converter 104 output 131 is regulated at 12.0 volts or higher, whereas, the regulator 128 provides a 11.0 volt output. Once the output 131 of the DC-to-DC converter 104 exceeds 11.5 volts, which is one diode voltage drop higher than 11.0 volts, this inhibits operation of the regulator 128.

Figure 8B:
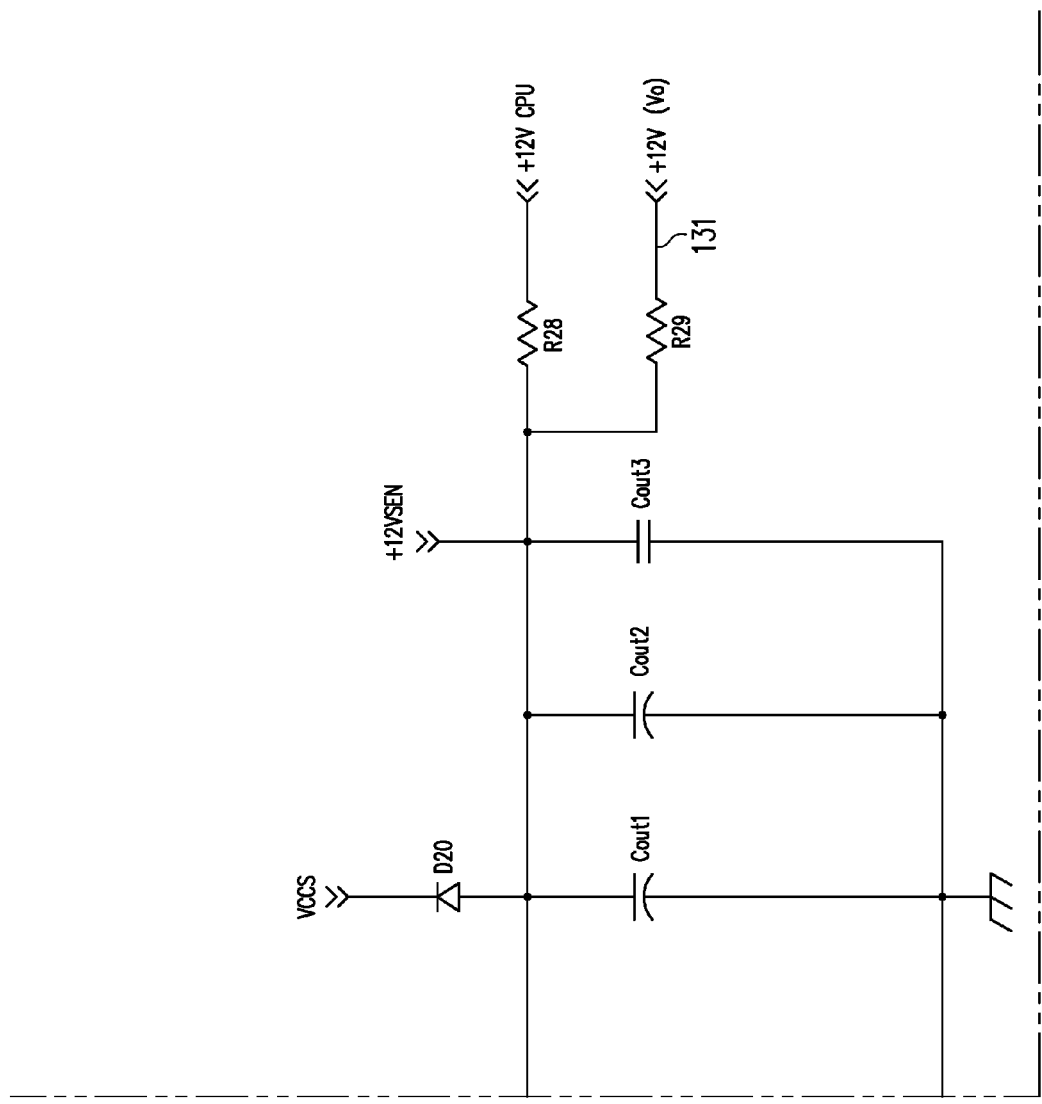
Figure 8C:
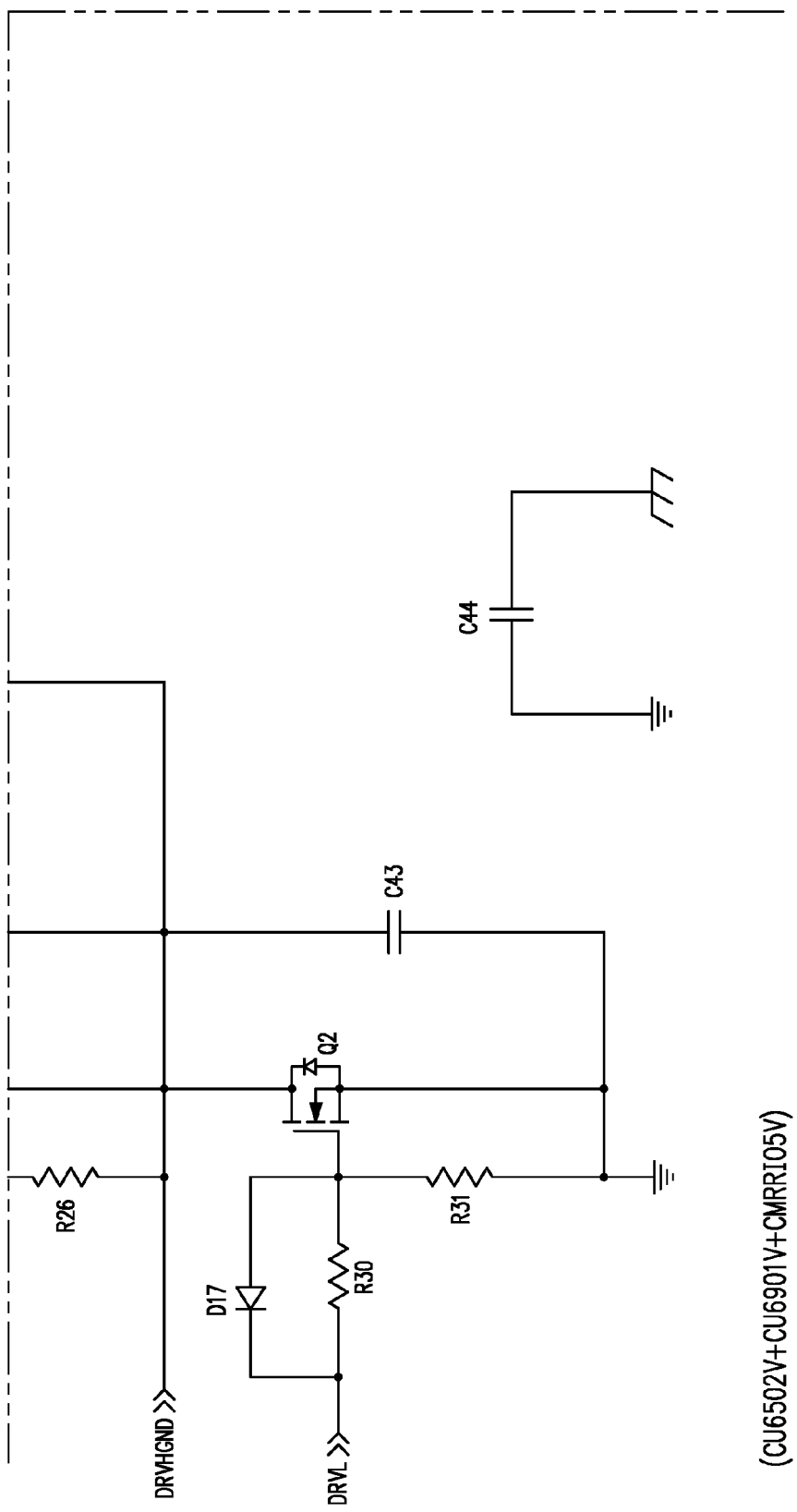
Figure 8D:
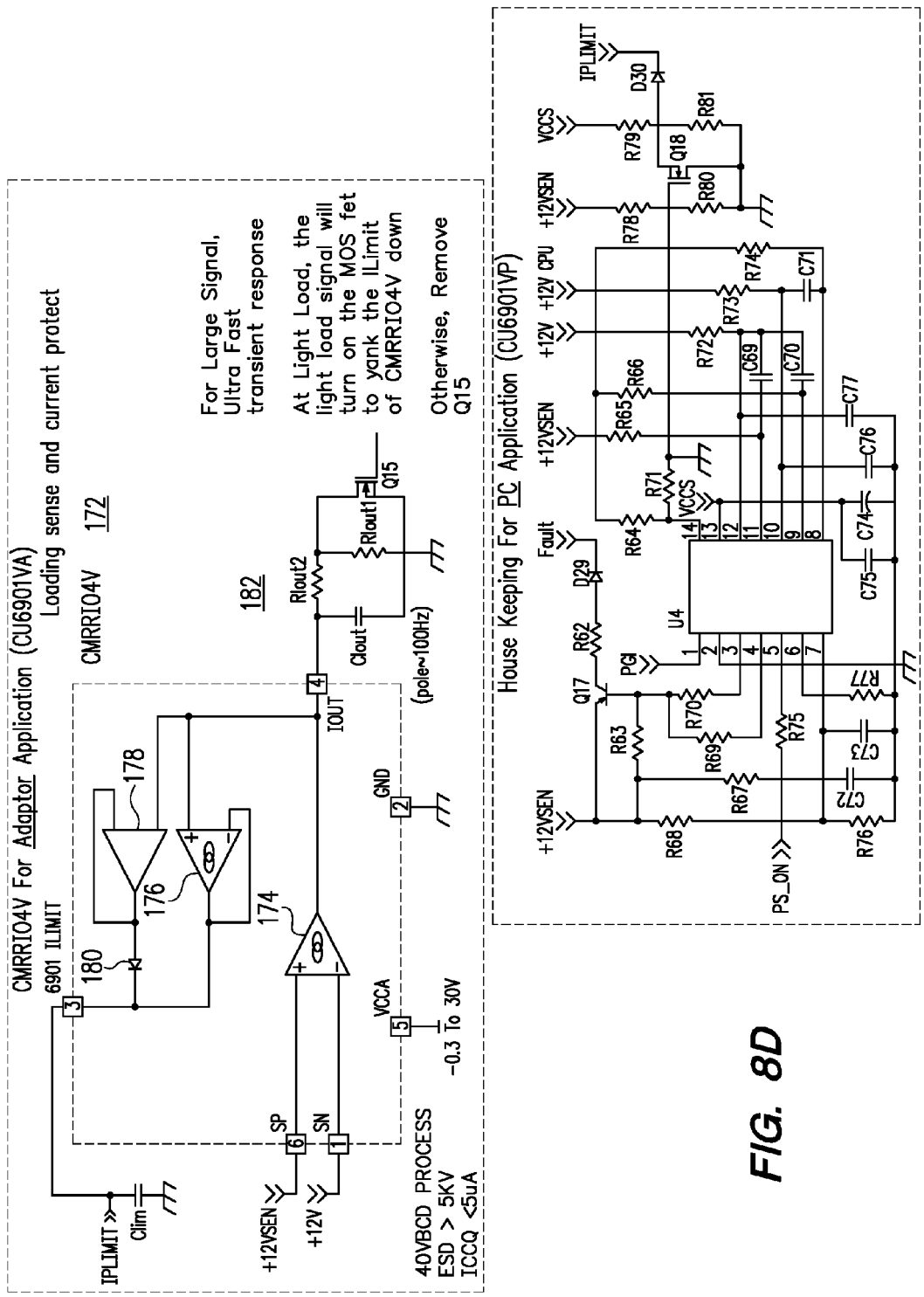

FIG. 7A-D illustrates a detailed schematic diagram of a DC-to-DC converter and DC-to-DC converter controller in accordance with an embodiment of the present invention. FIG. 8A-D illustrates DC-to-DC converter transformer circuitry in accordance with an embodiment of the present invention. FIGS. 7 and 8 show additional details regarding the arrangement of the voltage regulator 128 and the diode $D_{20}$ which are described in connection with FIG. 6.

Referring to FIG. 8A-D, energy from the PFC output $V_{DC}$ is converted to a regulated output $V_O$ by the DC-to-DC converter stage 104 by activation of switches Q1 and Q2 of the DC-to-DC converter stage 104. Resulting current in the transformer T1 generates an auxiliary voltage Vaux2. Referring to FIG. 4A-D, this auxiliary voltage Vaux2 can be provided as an input to a voltage regulator 132 for the PFC stage controller 108 (FIGS. 2, 3 and 4). The voltage regulator 132 generates a voltage VCC at its output. The level of VCC can be, for example, 15.3 to 15.5 volts DC.

The power supply is activated by applying an AC source to the AC inputs of the power supply. Power is then drawn from the bridge rectifier 110 (FIGS. 2 and 4) of the PFC stage 102 which charges VCC towards 15.5 volts. More particularly, current from the bridge rectifier 110 charges capacitors $C_{14}$ and $C_{60}$ via a depletion-mode MOSFET $M_{UVLO}$ and via a node R+ and resistors 140 shown in FIG. 4A-D. The MOSFET MUVLO preferably has a high breakdown voltage (e.g. 800 volts) Charging the capacitors to 15.5 volts can take, for example, 100 ms. Once VCC reaches 15.5 volts, an under voltage lockout (ULVO) signal disables the current path through $M_{UVLO}$ and enables the PFC controller 108 to begin switching. The PFC controller 108 then commences switching its transistor switches QA and QB (FIG. 2; FIG. 4A-D shows a diode $D_3$ in place of QA). This switching action begins increasing $V_{DC}$ towards its initial target level (e.g., 440 volts). The switching will continue as $V_{DC}$ reaches its target level, unless the level of VCC falls below 10.0 volts. If VCC falls below 10.0 volts, then the UVLO signal will disable switching in the PFC stage. As shown in FIG. 4A-D, a comparator 134 compares VCC to 15.5 volts and 10.0 volts. When VCC falls below 10.0 volts, switching is disabled. This could result in a failure of the power supply to commence operation because the level of VCC must then rise to 15.5 volts before switching will commence again. In accordance with an embodiment of the present invention, when VCC falls below a predetermined threshold, e.g., 11.0 volts, the UVLO switch ($M_{UVLO}$ in FIG. 4A-D) is activated which draws power from the bridge rectifier 110 (via node R+ and resistors 140 shown in FIG. 4A-D). Activation of $M_{UVLO}$ tends to increase VCC, preventing it from falling to a level that would cause the UVLO signal to inhibit switching.

FIGS. 7 and 8 additionally show details of a power-saving mode of operation for the DC-to-DC converter stage 104.

More particularly, FIG. 7A-D shows that the signal, IPLIMIT, which is representative of an output current of the DC-to-DC converter stage, is coupled to a detector/comparator 160 to detect a light load condition. When the level of IPLIMIT falls below a threshold (e.g. 50 mV), this indicates a light load condition. This threshold is preferably selectable, for example, by laser trimming to 75 mV, 100 mV or some other value. The comparator 160 preferably functions with hysteresis so as to avoid repeatedly enabling and disabling the power-saving mode of operation if the level of IPLIMIT fluctuates slightly. Thus, when the level of IPLIMIT rises above the threshold by a hysteresis margin, this indicates that the DC-to-DC converter stage is no longer in a light load condition. The output of the comparator 160 is coupled to kick mode logic 162 so as to enable a "burst" or "kick" mode of operation under such a light load condition.

In addition, a comparator 164 compares a feedback signal VFB, which is representative of an output voltage of the DC-to-DC converter stage, to a threshold (e.g., 2.495 volts), preferably with hysteresis, to generate a signal BURST at its output. Thus, while the "kick" mode is enabled by comparator 160, and the feedback signal VFB, falls below the threshold (e.g., 2.495 volts), switching of the DC-to-DC converter stage is enabled by comparator 164 and kick mode logic 162. A signal BURST generated by the comparator 164 is active and switching is enabled. When the feedback signal VFB rises above the threshold by the hysteresis margin (e.g., 0.01 volts), then the signal BURST is inactive and switching is disabled. Switching is therefore performed in bursts while the level of VFB falls below the threshold (and the signal BURST is activated) and rises above the threshold (and the signal BURST deactivated).

In addition, when the DC-to-DC converter is not in kick mode, the output voltage is preferably regulated using frequency modulation. When the DC-to-DC converter is in kick mode, the switching frequency is preferably held constant during the switching bursts. Thus, the output voltage is regulated by varying the duration of the switching bursts (the signal BURST is active) as compared to periods between bursts when switching is halted (the signal BURST is inactive).

The constant switching frequency employed during switching bursts while the DC-to-DC converter stage is in kick mode is preferably user selectable. This is accomplished by coupling a reference voltage to a KICK input to the DC-to-DC converter controller 152. For example, where the DC-to-DC converter stage is a resonant converter, the kick mode switching frequency can be set at the resonant frequency, e.g. by coupling a reference of 1.5 volts to the KICK input. Alternatively, the kick mode switching frequency can be set at two times the resonant frequency, e.g. by coupling a reference of 2.0 volts to the KICK input. Still further the kick mode switching frequency can be set at three times the resonant frequency e.g. by coupling a reference of 2.5 volts to the KICK input. It will be apparent that other switching frequencies and reference voltages are possible.

Also shown in FIG. 7A-D is a comparator 166 that compares the level of IPLIMIT to a reference voltage (e.g. 5.5 volts) for over-current protection. Specifically, when the level of IPLIMIT is above this threshold, this indicates an over-current condition. In this case, the comparator 166 activates a "Fault" signal. The Fault signal can be communicated to the PFC stage 102 via a photo-couple 168, in which case, the PFC stage 102 can enter a "latch" condition in which switching is halted. Additionally, the IPLIMIT signal can be coupled to an amplifier 170. When the level of IPLIMIT exceeds the reference voltage (e.g. 5.5 volts), this reduces current output in the DC-to-DC converter stage 104.

As described above, when IPLIMIT falls below a low threshold (e.g., 50 mV), this indicates a light load condition and the DC-to-DC converter stage 102 can therefore enter a power-saving mode. Alternatively, rises above a high threshold (e.g., 5.5 volts), this indicates an over-current condition and the DC-to-DC converter stage 102 can therefore limit its output current and/or shut down switching in either or both of the PFC or DC-to-DC converter stages. Thus, the same signal IPLIMIT is used for two different functions: (1) for detecting a light load condition for entry into the power saving mode; and (2) for detecting an over-current condition.

The output current of the DC-to-DC converter stage tends to be choppy. As such, it is desired to smooth or average the level of the output current for sensing the light load condition. However, it is also desired to sense instantaneous output current for detecting an over-current condition.

FIG. 8A-D shows load sensing and peak current protection circuitry 172. Output current is sensed by amplifier 174 which generates a signal IOUT. The signal IOUT passes through two different paths to generate to the signal IPLIMIT. The first path is via an amplifier 176 which is a relatively slow and small current path that averages the output current and detects the light load condition. The second path is via an amplifier 178 and diode 180 which is a relatively fast and large current path for over-current protection. When the signal IPLIMIT is below the voltage drop across the diode 180, the protection function is disabled; however, when the signal IPLIMIT is above the diode 180 voltage drop, the protection function overrides the light load sensing function because the current provided by the amplifier 178 is much greater than the current provided by the amplifier 176.

The circuitry 172 thus functions as a power meter for the DC-to-DC converter. In an alternative embodiment, a comparator could be used instead of the diode 180 to enable the light load sensing path when the signal IPLIMIT is below a threshold (e.g. 0.5 volts).

A capacitor Clim provides a first pole for frequency compensation of the signal IPLIMIT. Compensation components 182 include a capacitor Clout, and resistors Rlout1 and Rlout2. The capacitor Clout provides a second pole for frequency compensation of the signal IPLIMIT. The values of the components Clim, Clout, Rlout1 and Rlout2 are selected to provide desired frequency responses for the two paths and to adjust a level of output current desired for entry into the light load power saving mode.

Figure 9:
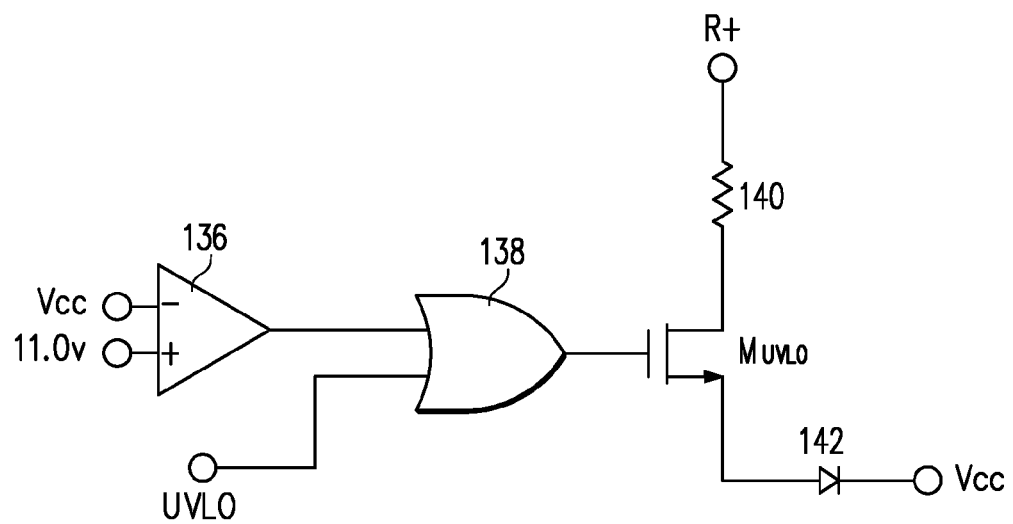
FIG. 9 illustrates a schematic diagram of circuitry for activing an under voltage lockout switch in accordance with an embodiment of the present invention.

FIG. 9 illustrates a schematic diagram of circuitry for activing $M_{UVLO}$ in accordance with an embodiment of the present invention. This circuity can be included in the PFC controller 108 (FIG. 4A-D). As shown in FIG. 9, a comparator 136 compares VCC to a threshold (e.g. 11.0 volts). An output of the comparator 136 is applied to a first input of a logic OR gate 138. The signal UVLO is applied to a second input of the logic OR gate 138. The output of the logic OR gate is applied to the transistor switch $M_{UVLO}$.

When VCC is below 10.0 volts, the UVLO signal prevents switching in the PFC stage until VCC rises to 15.5 volts. Thereafter, if VCC falls to 11.0 volts, $M_{ULVO}$ is activated, which tends to increase VCC and thereby assists in preventing VCC from falling below 10.0 volts.

As described herein, switching in the PFC stage produces the DC auxiliary power supply voltage Vaux1, which can be used by the regulator 128 of the controller 152 for the DC-to-DC converter stage 104 to generate VCCS. The DC-to-DC controller 152 commences operation once VCCS rises to a threshold, e.g. 11.0 volts, and the level of PGB to changes to a logic low voltage. Once the DC-to-DC converter commences operation, current in the transformer T1 generates the auxiliary voltage Vaux2. Referring to FIG. 4A-D, this auxiliary voltage Vaux2 can be provided as an input to the voltage regulator 132 for the PFC stage controller 108. Once VCCS rises above 11.5 volts, the regulator 128 is disabled.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A switching power supply comprising:
a first power supply stage that forms an intermediate regulated voltage; and
a second power supply stage configured to accept the intermediate regulated voltage and configured to form a regulated output voltage, wherein a signal that is representative of an output current of the second power supply stage is monitored by passing the signal along a first signal path to detect a light load condition and wherein the signal that is representative of the output current of the second power supply stage is monitored by passing the signal along a second signal path, parallel to the first signal path, to detect an overcurrent condition, wherein the first signal path and the second signal path have different frequency responses.

2. The switching power supply according to claim 1, wherein upon detection of the light load condition, the second power supply stage enters a power-saving mode in which switching is performed in bursts.

3. The switching power supply according to claim 1, wherein the first signal path detects an average of the output current and wherein the second signal path detects an instantaneous value of the output current.

4. The switching power supply according to claim 1, wherein the paths for the signal that is representative of an output current of the second power supply stage have a user-selectable first pole and a user-selectable second pole for frequency compensation.

5. The switching power supply according to claim 1, wherein a level of output current desired for entry into the power-saving mode is user-selectable.

6. The switching power supply according to claim 1, wherein in response to detection of an overcurrent condition, switching is disabled.

7. The switching power supply according to claim 1, wherein the first signal path and the second signal path are combined to form a combined signal, wherein a level of the combined signal is used to detect both the light load condition and the overcurrent condition.

8. The switching power supply according to claim 2, wherein a feedback signal representative of an output voltage of the second power supply stage is monitored in the power-saving mode of operation and wherein when the feedback signal falls below a threshold switching is enabled until the feedback signal rises above the threshold by a hysteresis margin.

9. The switching power supply according to claim 2, wherein switching in the second power supply stage is performed at a constant switching frequency in the power-saving mode.

10. The switching power supply according to claim 6, wherein the switching that is disabled is in the first power supply stage.

11. The switching power supply according to claim 9, wherein switching in the second power supply stage is performed in accordance with frequency modulation when not in the power-saving mode.

12. The switching power supply according to claim 9, wherein in the power-saving mode the output voltage is regulated by varying duration of switching bursts in comparison to periods between bursts.

13. The switching power supply according to claim 9, wherein the constant switching frequency is user-selectable.

14. The switching power supply according to claim 13, wherein the constant switching frequency is user-selectable by a reference voltage.

* * * * *